United States Patent
Iwahashi

(10) Patent No.: US 8,816,821 B2
(45) Date of Patent: Aug. 26, 2014

(54) TAG ASSOCIATING SYSTEM, TAG ASSOCIATING METHOD, AND TAG MOVING DIRECTION DETECTION SYSTEM

(75) Inventor: Naomasa Iwahashi, Kusatsu (JP)

(73) Assignee: Omron Corporation, Kyoto (JP)

( * ) Notice: Subject to any disclaimer, the term of this patent is extended or adjusted under 35 U.S.C. 154(b) by 649 days.

(21) Appl. No.: 12/675,340

(22) PCT Filed: Nov. 10, 2008

(86) PCT No.: PCT/JP2008/070376
§ 371 (c)(1),
(2), (4) Date: May 14, 2010

(87) PCT Pub. No.: WO2009/063815
PCT Pub. Date: May 22, 2009

(65) Prior Publication Data
US 2010/0237995 A1    Sep. 23, 2010

(30) Foreign Application Priority Data

Nov. 12, 2007  (JP) .................................. 2007-293543
Jul. 31, 2008   (JP) ................................. 2008-197561

(51) Int. Cl.
*H04Q 5/22*          (2006.01)

(52) U.S. Cl.
USPC .... 340/10.1; 340/10.3; 340/10.32; 340/572.1

(58) Field of Classification Search
USPC ........... 340/10.1–10.51, 572.1–572.7, 539.1, 340/5.2, 5.3, 5.32, 5.8, 8.1, 5.61, 5.65
See application file for complete search history.

(56) References Cited

U.S. PATENT DOCUMENTS 5,963,149 A * 10/1999 Nagura et al. ................. 340/933
2005/0104736 A1 * 5/2005 Gudat ......................... 340/686.6

(Continued)

FOREIGN PATENT DOCUMENTS

| EP | 1 693 807 A1 | 8/2006 |
|---|---|---|
| JP | 03-036199 | 2/1991 |

(Continued)

OTHER PUBLICATIONS

International Search Report corresponding to PCT/JP2008/070376, dated Feb. 10, 2009, 2 pgs.

(Continued)

*Primary Examiner* — Nabil Syed
(74) *Attorney, Agent, or Firm* — Foley & Lardner LLP

(57) ABSTRACT

[Problems to be Solved]
It is an object to provide a tag associating system that, when a plurality of RFID tags are collected to move as a tag group, associates the RFID tags belonging to the tag group with a representative RFID tag ranked as a representative of the tag group; its associating method; etc.
[Means for Solving the Problems]
The present system associates an RFID tag (2A) ranked as a representative of the tag group (2). A communication area (J) of a first antenna (4A) to read out data from the representative tag group (2A) is arranged to partially overlap with a communication area (K) of a second antenna (4B) to read out data from each RFID tag (2B) of the tag group (2). When the first antenna (4A) reads out a plurality of times data from the representative RFID tag (2A), the second antenna (4B) reads out data from each RFID tag (2B) of the tag group (2), so as to make the data read out from the representative RFID tag (2A) and the data reads out from the RFID tag (2B) of the tag group (2) into a pair of associated data.

6 Claims, 24 Drawing Sheets

(56) References Cited

U.S. PATENT DOCUMENTS

| | | |
|---|---|---|
| 2006/0077036 A1* | 4/2006 | Roemerman et al. ........ 340/5.61 |
| 2006/0220859 A1* | 10/2006 | Nagai et al. ................ 340/572.1 |
| 2006/0255950 A1* | 11/2006 | Roeder et al. .............. 340/572.7 |
| 2008/0061942 A1* | 3/2008 | Maniwa ....................... 340/10.3 |
| 2008/0117023 A1* | 5/2008 | Wilcox et al. ................ 340/10.1 |
| 2008/0150692 A1* | 6/2008 | Missimer et al. ............ 340/10.1 |
| 2008/0266092 A1* | 10/2008 | Campero et al. ........... 340/572.1 |

FOREIGN PATENT DOCUMENTS

| | | |
|---|---|---|
| JP | 2003-185730 | 7/2003 |
| JP | 2006-010345 | 1/2006 |
| JP | 2006-010532 | 1/2006 |
| JP | 2007-119239 | 5/2007 |

OTHER PUBLICATIONS

European Patent Office extended search report on application 08848972.9 mailed Jul. 8, 2013; 5 pages.

* cited by examiner (a)

Scan pattern table  T1

| Table NO. | Scan angle |
|---|---|
| 0 | α |
| 1 | β |

| Readout NO. | Readout time | Representative RFID tag NO. (ID) | Table NO. |
|---|---|---|---|
| 1 | t1 | 100001 | 0 |
| 2 | t2 | 100001 | 0 |
| 3 | t3 | 100001 | 0 |
| 4 | t4 | 100001 | 0 |
| 5 | t5 | 100001 | 0 |
| 6 | t6 | 100001 | 0 |
| 7 | t7 | 100001 | 0 |
| 8 | t8 | 100001 | 0 |
| 9 | t9 | 100001 | 0 |
| 10 | t10 | 100001 | 1 |
| 11 | t11 | 100001 | 0 |
| 12 | t12 | 100001 | 1 |
| 13 | t13 | 100001 | 1 |
| 14 | t14 | 100001 | 1 |
| 15 | t15 | 100001 | 1 |
| 16 | t16 | 100001 | 1 |
| 17 | t17 | 100001 | 1 |
| 18 | t18 | 100001 | 0 |
| 19 | t19 | 100001 | 1 |
| 20 | t20 | 100001 | 1 |

Fig. 16

Moving direction calculation table (a)                                                                 T3

| x<br>Readout NO. | y<br>Table NO. | x*y | x*x |
|---|---|---|---|
| 1 | 0 | 0 | 1 |
| 2 | 0 | 0 | 4 |
| 3 | 0 | 0 | 9 |
| 4 | 0 | 0 | 16 |
| 5 | 0 | 0 | 25 |
| 6 | 0 | 0 | 36 |
| 7 | 0 | 0 | 49 |
| 8 | 0 | 0 | 64 |
| 9 | 0 | 0 | 81 |
| 10 | 1 | 10 | 100 |
| 11 | 0 | 0 | 121 |
| 12 | 1 | 12 | 144 |
| 13 | 1 | 13 | 169 |
| 14 | 1 | 14 | 196 |
| 15 | 1 | 15 | 225 |
| 16 | 1 | 16 | 256 |
| 17 | 0 | 0 | 289 |
| 18 | 1 | 18 | 324 |
| 19 | 1 | 19 | 361 |
| 20 | 1 | 20 | 400 |

(b)

| $\Sigma x$ | $\Sigma y$ | $\Sigma x*y$ | $20*\Sigma x*y$ | $\Sigma x*x$ | $20*\Sigma x*x$ | Slope value S |
|---|---|---|---|---|---|---|
| 210 | 9 | 137 | 2740 | 2870 | 57400 | 0.0639 |

First management table

| Package ID | Pallet ID | Moving direction |
|---|---|---|
| -- | -- | -- |

T4

Second management table

| Pallet ID | Moving direction |
|---|---|
| -- | -- |

T5

Third management table

| ID |
|---|
| -- |

T6

First management table

Second management table

Third management table

Fig. 24

First management table                          T4

| Package ID | Pallet ID | Moving direction |
|---|---|---|
| 000001 | - - | Enter |
| 000002 | - - | Enter |
| 000003 | - - | Enter |
| ⋮ | ⋮ | ⋮ |
| ⋮ | ⋮ | ⋮ |
| 00000C | - - | Enter |

Add

Second management table       T5

| Pallet ID | Moving direction |
|---|---|
| 100001 | Enter |

Third management table    T6

| ID |
|---|
| - - |

Fig. 25

First management table  T4

| Package ID | Pallet ID | Moving direction |
|---|---|---|
| 000001 | - - | Enter |
| 000002 | - - | Enter |
| 000003 | - - | Enter |
| : | : | : |
| : | : | : |
| 00000C | - - | Enter |

Second management table  T5

| Pallet ID | Moving direction |
|---|---|
| 100001 | Enter |

Third management table  T6

| ID |
|---|
| 000003 |

(Record)

US 8,816,821 B2

TAG ASSOCIATING SYSTEM, TAG ASSOCIATING METHOD, AND TAG MOVING DIRECTION DETECTION SYSTEM

CROSS-REFERENCE TO RELATED APPLICATIONS

This is a National Stage application of PCT/JP2008/070376, filed Nov. 10, 2008, which claims the benefit and priority of Japanese Patent Application No. 2007-293543, filed Nov. 12, 2007 and Japanese Patent Application No. 2008-197561, filed Jul. 31, 2008. The foregoing applications are incorporated by reference herein in their entirety.

TECHNICAL FIELD

The present invention relates to a tag associating system that, when a plurality of RFID tags are collected to move as a tag group, associates the RFID tags belonging to the tag group with a representative RFID tag ranked as a representative of the tag group, an associating method thereof, and a tag moving direction detection system enabling the moving direction of the plurality of RFID tags belonging to the tag group to be correctly detected.

BACKGROUND ART

In recent years, a method of attaching the RFID (Radio Frequency Identification) tag to a package, and performing package management by carrying out wireless communication between the RFID tag and the reader/writer is used. According to such method, the efficiency of distribution task can be achieved since the data such as ID (Identification) can be automatically read out from the RFID tag attached to the package conveyed by a pallet and the like. However, the moving direction of the package and the RFID tag attached thereto cannot be detected, and entering and exit cannot be automatically detected.

A typical known method for detecting the moving direction of the RFID tag is a method using a sensor. In such general method, a sensor for detecting the moving direction of the object is installed at the periphery of the antenna for reading the data from the RFID tag attached to the package. The communication is carried out between the reader/writer and the RFID tag through the antenna when the package attached with the RFID tag is conveyed by humans, machines, and the like, and passes through the front of the antenna. At the same time, the sensor reacts to detect the moving direction of the package, and the person or the machine conveying the same. Therefore, the moving direction of the package, the human, and the machine detected by the sensor can be estimated as the moving direction of the RFID tag.

However, according to the technique using the sensor as described above, the moving direction of the RFID tag is indirectly estimated by reacting the sensor to humans, machines, and the like conveying the package irrespective of the RFID tag. Thus, the sensor sometimes reacts to objects not relevant to the package attached with the RFID tag such as humans, machines, and the like not conveying the package. In this case, the moving direction of the RFID tag cannot be correctly detected since the moving direction of the irrelevant object is estimated as the moving direction of the RFID tag. For instance, if the irrelevant object is moving in the direction opposite to the moving direction of the RFID tag, the moving direction of the RFID tag to be estimated becomes opposite to the actual moving direction.

The technique of specifying the position of the RFID tag is disclosed in patent document 1, but the moving direction of the RFID tag cannot be detected if the RFID tag moves. Furthermore, if another RFID tag moves with such RFID tag, the RFID tags cannot be associated with each other.

Patent document 1: Japanese Laid-Open Patent Publication No. 2006-10345

DISCLOSURE OF THE INVENTION

Problems to be Solved by the Invention

In view of solving the above problems, it is an object of the present invention to provide a tag associating system that, when a plurality of RFID tags are collected to move as a tag group, associates the RFID tags belonging to the tag group with a representative RFID tag ranked as a representative of the tag group, an associating method thereof, and a tag moving direction detection system enabling the moving direction of the plurality of RFID tags belonging to the tag group to be correctly detected.

In order to achieve the above objects, there is provided a system for associating RFID tags belonging to a tag group with a representative RFID tag ranked as a representative of the tag group, wherein a communication area of a first antenna to read out data from the representative RFID tag is arranged to partially overlap with a communication area of a second antenna to read out data from each RFID tag of the tag group; the second antenna reads out data from each RFID tag of the tag group while the first antenna reads out a plurality of times data from the representative RFID tag; and the data read out from the representative RFID tag and the data read out from the RFID tag of the tag group are made into a pair of associated data.

In the tag associating system according to present invention, an attribute of the representative RFID tag is used as an attribute of the RFID tag belonging to the tag group if the RFID tag belonging to the tag group and the representative RFID tag are associated with each other.

In the tag associating system according to present invention, information of a moving direction of the representative RFID tag, which is the attribute of the representative RFID tag, is used as information of a moving direction of the RFID tag, which is the attribute of the RFID tag belonging to the tag group.

In the tag associating system according to present invention, the RFID tag belonging to the tag group and the representative RFID tag have a directional direction of NULL; a radio wave beam output from the first antenna is directed in the directional direction of NULL of the RFID tag belonging to the tag group; and a radio wave beam output from the second antenna is directed in the directional direction of NULL of the representative RFID tag.

In the tag associating system according to present invention, an output intensity of the radio wave beam output from the first antenna is adjusted to a level communicable with only the representative RFID tag.

A tag associating method according to the present invention is a tag associating method of associating RFID tags belonging to a tag group, and a representative RFID tag ranked as a representative of the tag group; the associating method including the steps of: partially overlapping a communication area of a first antenna to read out data from the representative RFID tag and a communication area of a second antenna to read out data from each RFID tag of the tag group; reading out data from each RFID tag of the tag group by the second antenna while the first antenna reads out a plurality of times data from the representative RFID tag; and making the data read out from the representative RFID tag and the data read out from the RFID tag of the tag group into a pair of associated data.

The tag moving direction detection system according to the present invention is a system for detecting the moving direction of the RFID tag (2B) belonging to a tag group (2), as shown in the claim corresponding diagram of FIG. 1(b), the system including a representative RFID tag (2A) ranked as a representative of the tag group (2), a first antenna for scanning a radio wave beam towards a movement path of the representative RFID tag (2A) and reading out data from the representative RFID tag (2A), a second antenna (4B) for collectively reading out data from each RFID tag (2B) of the tag group (2), and estimation means (6) for estimating the moving direction of the representative RFID (2A) based on the data read out from the representative RFID tag (2A) by the first antenna (4A), a readout time, and a scan angle at the time of readout, wherein information of the moving direction of the representative RFID tag (2A) estimated by the estimation means (6) is added to the data read out from each RFID tag (2B) of the tag group (2).

In the tag moving direction detection system according to the present invention, the communication area of the first antenna and the communication area of the second antenna partially overlap, the second antenna collectively reads out the data from each RFID tag of the tag group while the first antenna reads out the data from the representative RFID tag a plurality of times, the data read out from the representative RFID tag and the data read out from each RFID tag of the tag group are made into a pair of associated data, and the information of the moving direction of the representative RFID tag estimated by the estimation means may be added to the data read out from the RFID tag of the tag group.

In the tag moving direction detection system according to the present invention, the RFID tags belonging to the tag group and the representative RFID tag each have a directional direction of NULL, where the radio wave beam output from the first antenna is directed in the directional direction of NULL of the RFID tag belonging to the tag group, and the radio wave beam output from the second antenna is directed in the directional direction of NULL of the representative RFID tag.

In the tag moving direction detection system according to the present invention, the output intensity of the radio wave beam output from the first antenna may be adjusted to a level communicable with only the representative RFID tag.

In order to associate two physically independent objects such as the representative RFID tag with the RFID tag belonging to the tag group as acting together, it is a requirement that such objects at least shared the same area and the same time. In the present invention, "the second antenna (4B) reads out the data from each RFID tag (2B) of the tag group (2) while the first antenna (4A) reads out the data from the representative RFID tag (2A) a plurality of times" is provided as a means for satisfying the requirement in terms of time. Furthermore, in the present invention, "the communication area (J) of the first antenna (4A) to read out the data from the representative RFID tag (2A) partially overlaps the communication area (K) of the second antenna (4B) to read out the data from each RFID tag (2B) of the tag group (2)" is provided as a means for satisfying the requirement in terms of area.

In the present invention, the "tag group" includes two or more RFID tags collected to one area as one group such as the group of RFID tags given to each of the plurality of packages mounted on the pallet.

In the tag associating method according to the present invention, the "tag group" includes both moving and non-moving groups, and the RFID tag belonging to the non-moving tag group and the representative RFID tag may be associated with each other.

The "representative RFID tag" is physically independent from the tag group such as the pallet for mounting the packages, which are given the RFID tags belonging to the tag group, but includes the RFID tag given to an object that acts together with the tag group.

The "representative RFID tag" may or may not be included in the tag group (2). In FIGS. 1(a) and 1(b), the representative tag (2B) is illustrated so as not to be included in the tag group (2) by being arranged on the outer side of the tag group (2), but the representative tag (2B) may be included in the tag group (2) by being arranged on the inner side of the tag group (2) in the figure.

The "attribute of the representative RFID tag" has not all of the attributes but a predetermined portion of the attributes such as only the portion that can be commonly used by the RFID tags belonging to the tag group and the representative RFID tag including the tag moving direction usable as the attribute of the RFID tag belonging to the tag group. For instance, if the representative RFID tag is given to the pallet, the name of the owner of the pallet is given to the representative RFID tag as owner attribute, but if 20 rice bales are arranged on the pallet, the owner of each rice bale is the purchaser of the rice bale and differs from the owner of the pallet, and hence the owner attribute (owner of pallet) given to the representative RFID tag will not be used as the attribute of the RFID tag belonging to the tag group.

The "representative RFID tag" and the "RFID tag belonging to the tag group" may be a passive type RFID tag that does not include a power supply such as a battery and that wirelessly communicates with the reader/writer when the circuit operates by the power supplied from the reader/writer by radio waves, or an active type RFID tag that includes a power supply such as a battery.

The scan antenna can be used for the "first antenna". The scan antenna is an antenna capable of radiating the radio waves in plural directions, and can electronically scan the radiation direction of the radio waves. In the present invention, the scan antenna includes a phased array antenna capable of scanning, at high speed, the beam of the radio waves transmitted by electronic control. The scan antenna is configured by a plurality of antenna elements, a plurality of phase shifters respectively connected to the plurality of antenna elements, and one distribution synthesizer connected to all plurality of phase shifters, but a scan antenna having other configurations may be used. The radio waves input to the distribution synthesizer is distributed to the phase shifter for each antenna element, and radiated from each antenna element after being changed to the desired phase in each phase shifter. The radio waves are strongly radiated in the direction each radio wave after the phase shift becomes the same phase, that is, the direction the phases of the sinusoidal wave coincides with each other. Such strongest radio waves are the "radio wave beam" of the "first antenna" in the present invention, and is a main lobe etc., the direction of which main lobe can be arbitrarily changed by the setting of the phase shifter.

Instead of using the scan antenna, a configuration in which an antenna same as the second antenna is installed in plurals in different directions, and the information of the RFID tag is read while switching each antenna at high speed may be adopted for the "first antenna".

The plurality of antenna elements may be configured by a path antenna, or the plurality of antenna elements may be two-dimensionally arrayed so that the scan antenna can two-dimensionally scan the movement path of the representative RFID tag. It is suitable to configure the plurality of antennas from the patch antenna since the scan antenna can be manufactured thin, and the manufacturing cost can be suppressed low. Furthermore, if the plurality of antennas are two-dimensionally arrayed, for example, if the plurality of antenna elements are arrayed to a circular form, a matrix form, or the like on the same plane, scanning can be performed as if drawing a circle, and thus the moving direction of the representative RFID tag can be two-dimensionally detected. In other words, the movement in the X-direction and the movement in the Y-direction can be simultaneously detected when the representative RFID tag moves on the XY plane.

The "data" read out from the representative RFID tag and the "data" read out from the RFID tag belonging to the tag group may be ID (Identification) including the tag NO. for identifying the RFID tag. This ID can be used to detect "what" moved.

The "scan angle" is an angle indicating the radiation direction of the beam when the scan antenna scans the beam of the transmitting radio wave. For instance, the scan angle is an inclination angle of the beam measured with the broadside direction as a reference when using the phased array antenna, in which a plurality of antenna elements is linearly arrayed, for the scan antenna.

According to the tag associating method of the present invention, the attribute can be easily copied since the representative RFID tag and the RFID tag belonging to the tag group can be associated with each other when using the attribute of the representative RFID tag as the attribute of each RFID tag belonging to the tag group such as when adding the information on the estimated moving direction of the representative RFID tag to the data read out from each RFID tag of the tag group.

In the moving direction detection system according to the present invention, there may be adopted a configuration of estimating the moving direction of the representative RFID tag, and adding information on the estimated moving direction of the representative RFID tag to the data read out from the RFID tag of the tag group. Thus, the moving direction of the tag group and each RFID tag belonging thereto can be detected from the added information on the moving direction of the representative RFID tag. The number of representative RFID tags does not change even if the number of RFID tags belonging to the tag group becomes a great number. Thus, the moving direction of a plurality of RFID tags belonging to the tag group can be correctly detected without the estimation of the moving direction becoming difficult or impossible, or without the estimation accuracy lowering.

BRIEF DESCRIPTION OF THE DRAWINGS

FIG. 13 is a view showing a scan pattern table.

FIG. 14 is a view showing a measurement data table.

FIGS. 16(a) and 16(b) are views showing a moving direction calculation table.

FIG. 24 is an explanatory view of the storage state of the data in the management tables of FIG. 18.

FIG. 25 is an explanatory view of the storage state of the data in the management tables of FIG. 18.

Figure 1:
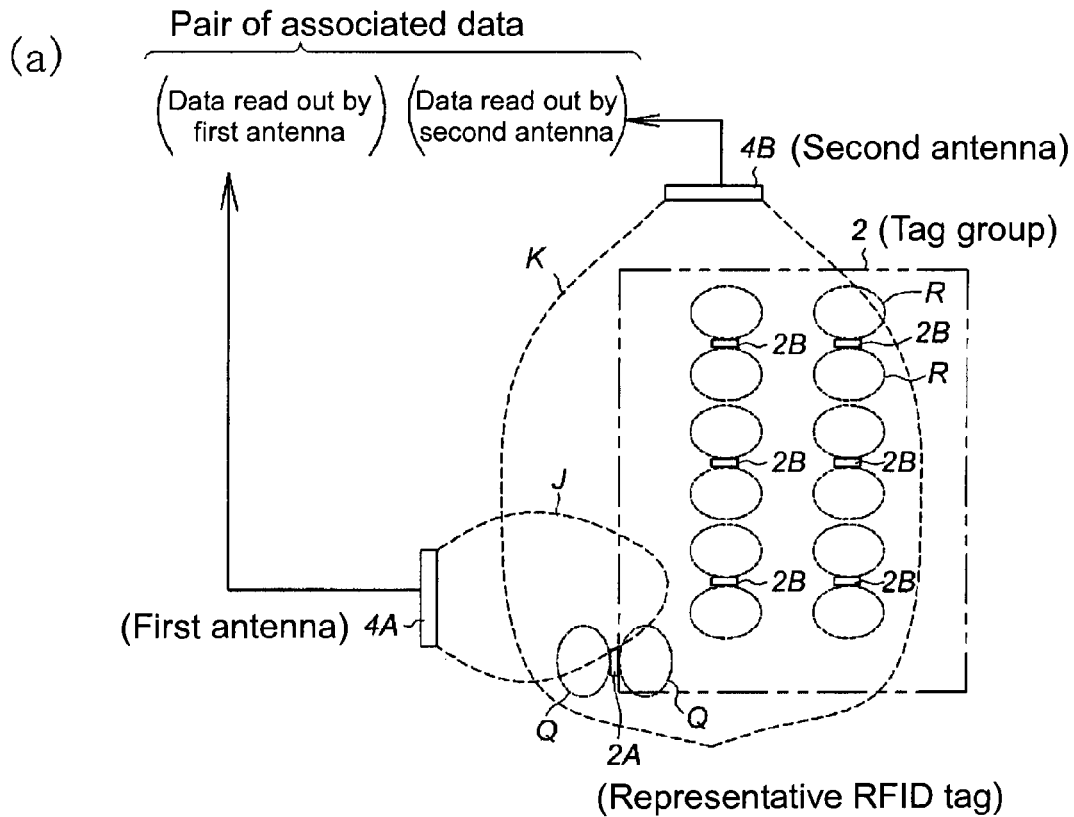
FIG. 1(a) is a claim corresponding diagram corresponding to the invention of the tag associating system, and (b) is a claim corresponding diagram corresponding to the invention of the tag moving direction detection system.
Figure 1:
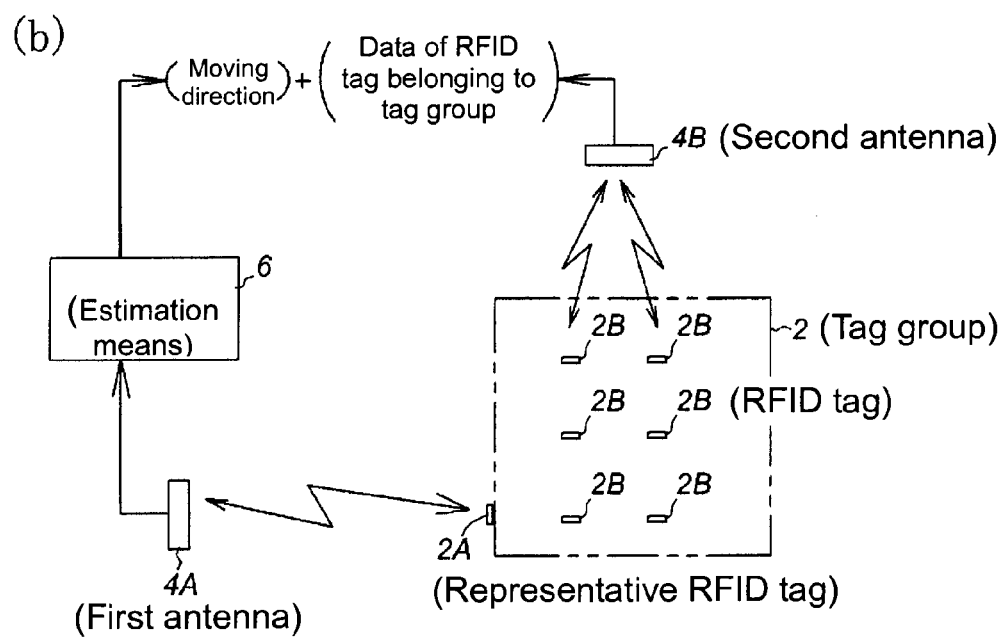

DESCRIPTION OF SYMBOLS 2 tag group
2A representative RFID tag
2B RFID tag belonging to tag group
3A first reader/writer
3B second reader/writer 32 tag communication control unit
36 recording unit
37 moving direction estimation unit
4A first antenna (scan antenna SA)
4B second antenna
40A, 40B antenna element
41A, 41B, . . . 41K phase shifter
5 package
6 estimation means
7 high-order computer
G moving direction determination graph (plot graph)
GT gate
J communication area of first antenna
K communication area of second antenna
SA scan antenna (first antenna 4A)
T1 scan pattern table
T2, T5 measurement data table
T3 first moving direction calculation table
T4 first management table
T5 second management table
T6 third management table
L linear approximation line
P, P' plot
M beam
α, β scan angle

BEST MODE FOR CARRYING OUT THE INVENTION

Figure 2:
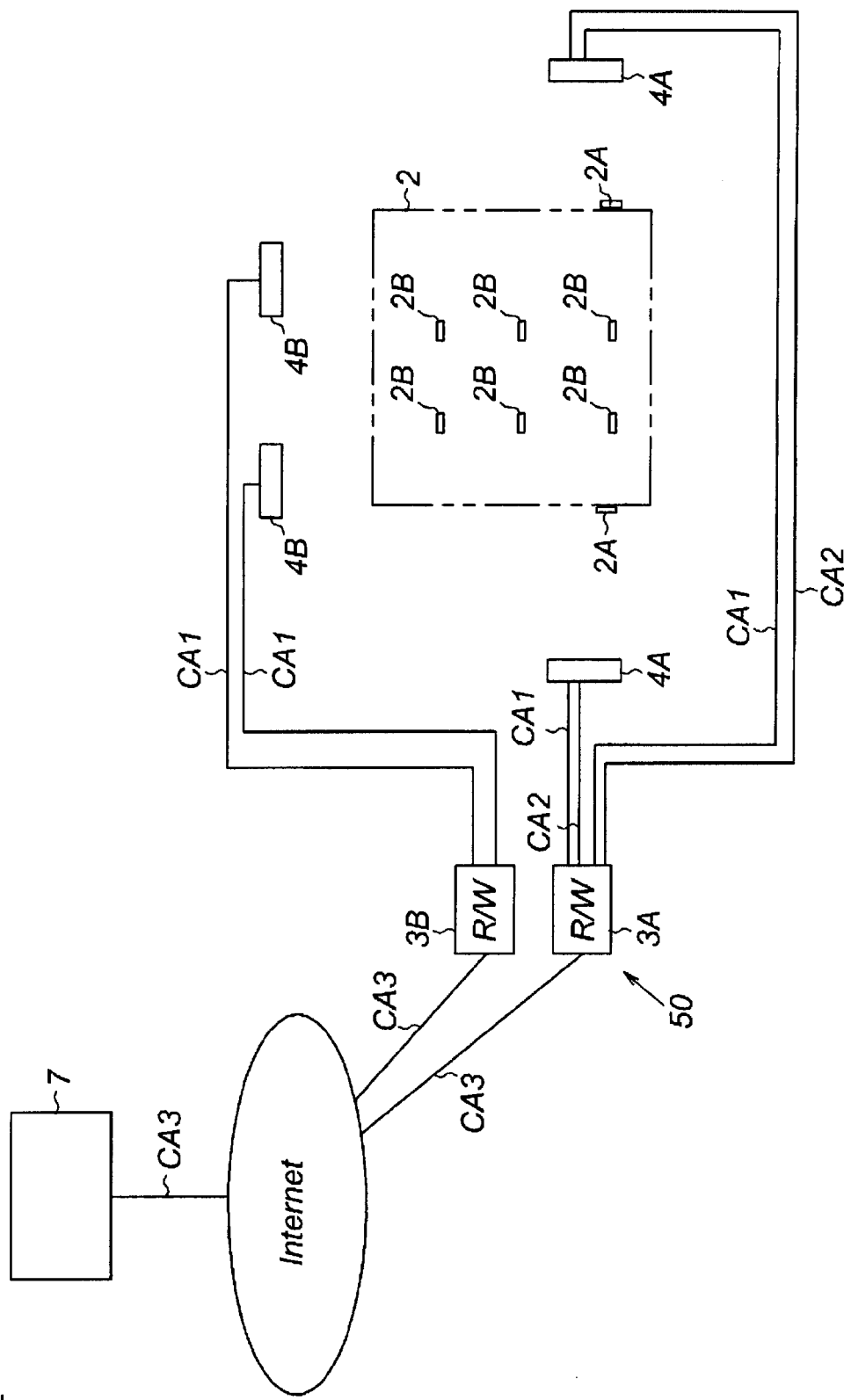
FIG. 2 is an explanatory view showing a device configuration of an RFID communication system applied with the tag associating system and the tag moving direction detection system according to the present invention.
Figure 3:
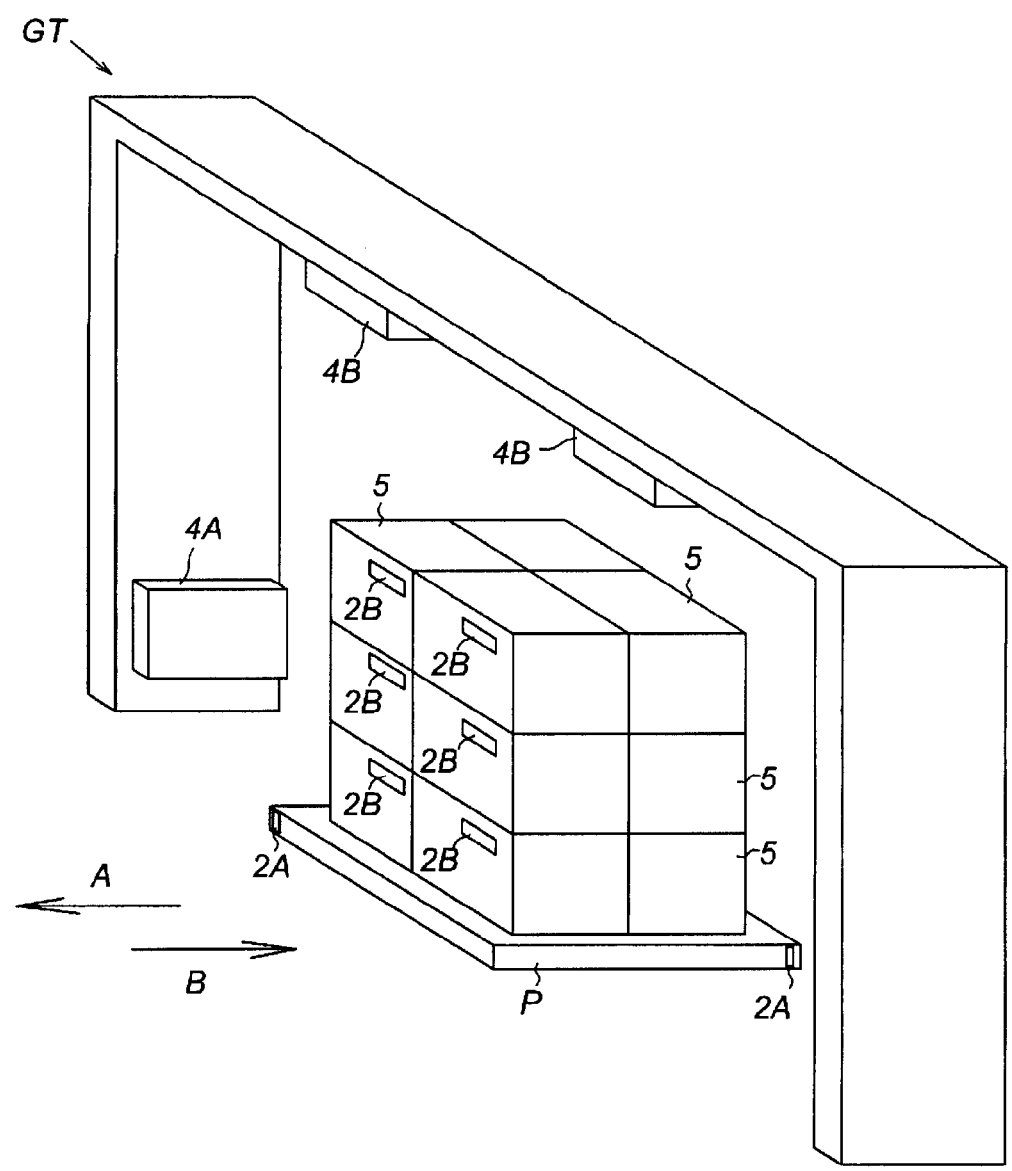
FIG. 3 is a perspective view showing the arrangements of the first and second antennas configuring the RFID communication system of FIG. 2 and the tag group passing through the front of the antennas.

Best modes for carrying the invention will be specifically described with reference to the accompanied drawings.
<Basic Configuration of RFID Communication System Applied with the Present Invention>
FIG. 2 is an explanatory view of a device configuration of an RFID communication system applied with the tag associating system, the tag associating method, and the tag moving direction detection system according to the present invention, and FIG. 3 is a perspective view showing the arrangements of first and second antennas configuring the RFID communication system of FIG. 2 and a tag group passing through the front of such antennas.

As shown in FIG. 3, the RFID communication system is a system having a function of detecting the moving direction of each RFID tag 2B belonging to the tag group 2 when a plurality of packages 5 with the RFID tag 2B is moved on a pallet 5 as shown in FIG. 3, assuming the RFID tag 2B given to the individual package 5 as one tag group 2 as a whole.

As shown in FIG. 2, the RFID communication system includes a representative tag group 2A ranked as a representative of the tag group 2, a first reader/writer 3A including a first antenna 4A for scanning the radio wave beam towards a movement path of the representative RFID tag 2A and reading out data from the representative RFID tag 2A, and a second reader/writer 3B including a second antenna 4B for collectively reading out data from the RFID tag 2B of the tag group 2, as a means for implementing the function. The first reader/writer 3A has a function of estimating the moving direction of the representative RFID 2A based on the data (ID) read out as data from the representative RFID tag 2A by the first antenna 4A, the readout time thereof, and the scan angle at the time of readout, that is, a function serving as estimation means 6 of FIG. 1(b). In the RFID communication system, the information on the estimated moving direction of the representative RFID tag 2A can be used as the information on the moving direction, i.e., the attribute of the RFID tag 2B belonging to the tag group 2 when the RFID tag 2B belonging to the tag group 2 and the representative RFID tag 2A are associated with each other. The usage thereof specifically adopts a method of adding information on the estimated moving direction of the representative tag 2A to the ID (data) read out from the RFID tag 2B of the tag group 2.

The RFID communication system will be specifically described below.

In the RFID communication system, assumption is made in system operation that a gate GT shown in FIG. 3 is arranged at a region to detect the moving direction of the RFID tag 2B belonging to the tag group 2 such as at the entrance/exit of a building, and that a plurality of packages 5 mounted on the pallet P passes through the gate GT.

The width of the gate GT is about 1.5 times the maximum size of the pallet P passing through the gate GT, and prohibits two pallets P from simultaneously passing through the gate GT in parallel.

The representative RFID tag 2A is given to the pallet P and the RFID tag 2B is given to each of the plurality of packages 5 conveyed on the pallet P, as shown in FIG. 3, where the plurality of RFID tags 2B given to the packages 5 are assumed as the tag group on one pallet P.

In the RFID communication system, the moving direction of the representative RFID tag 2A given to the pallet P is estimated and detected when the one pallet P passes through the gate GT. During the detection of the moving direction, the next pallet is prohibited from passing through the gate such as with a method of closing the gate GT with a bar.

Figure 4:
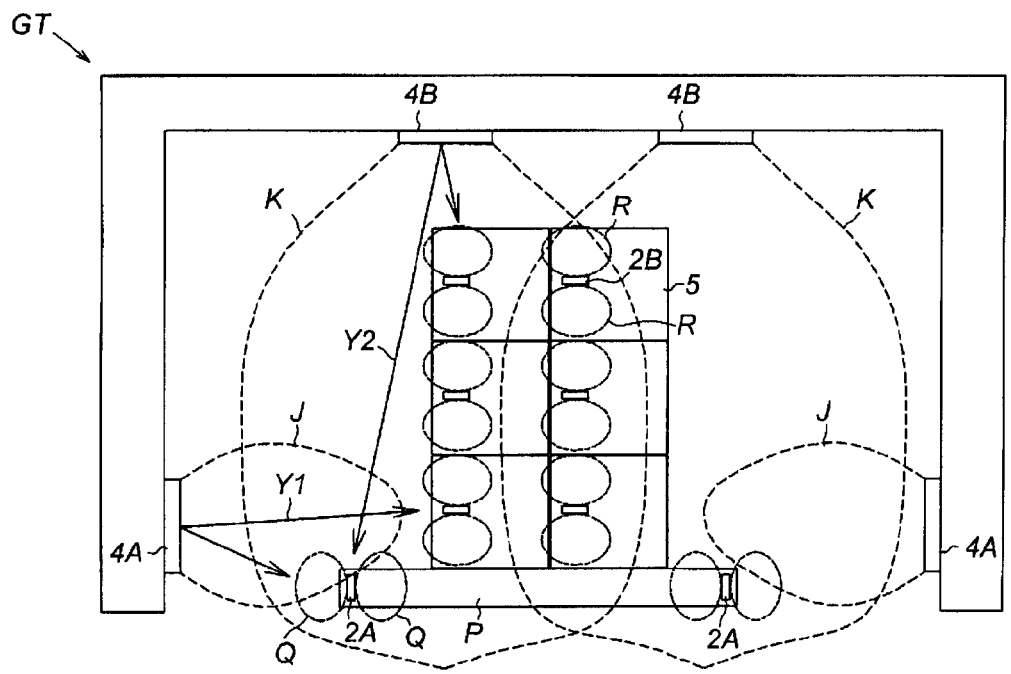
FIG. 4 is an explanatory view showing the directional direction and the communication area of each antenna, the representative RFID tag, and the RFID tag belonging to the tag group when seen from the front side of the gate of FIG. 3.
Figure 5:
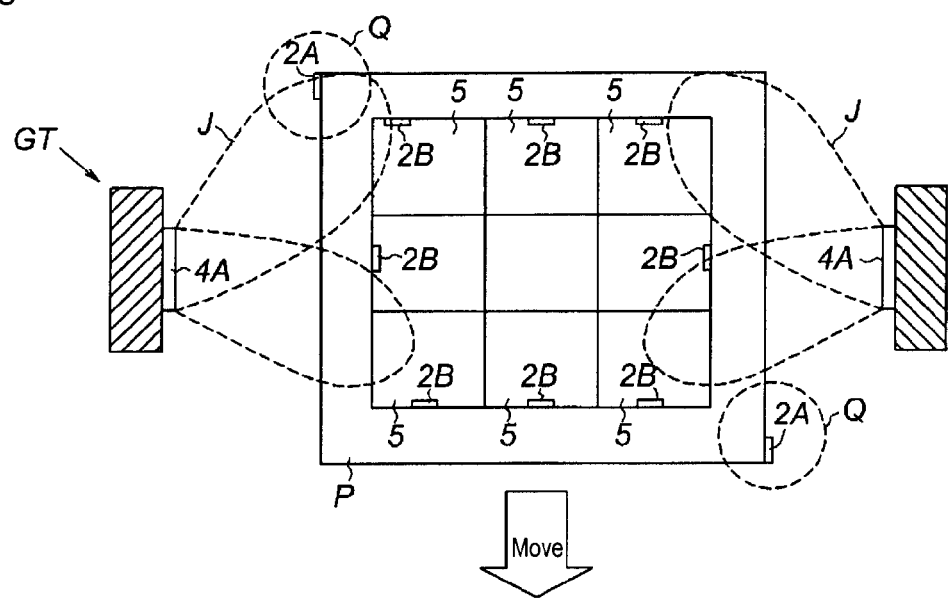
FIG. 5 is an explanatory view showing the directional direction and the communication area of the first antenna and the representative RFID tag when seen from the upper side of the gate of FIG. 3.
Figure 6:
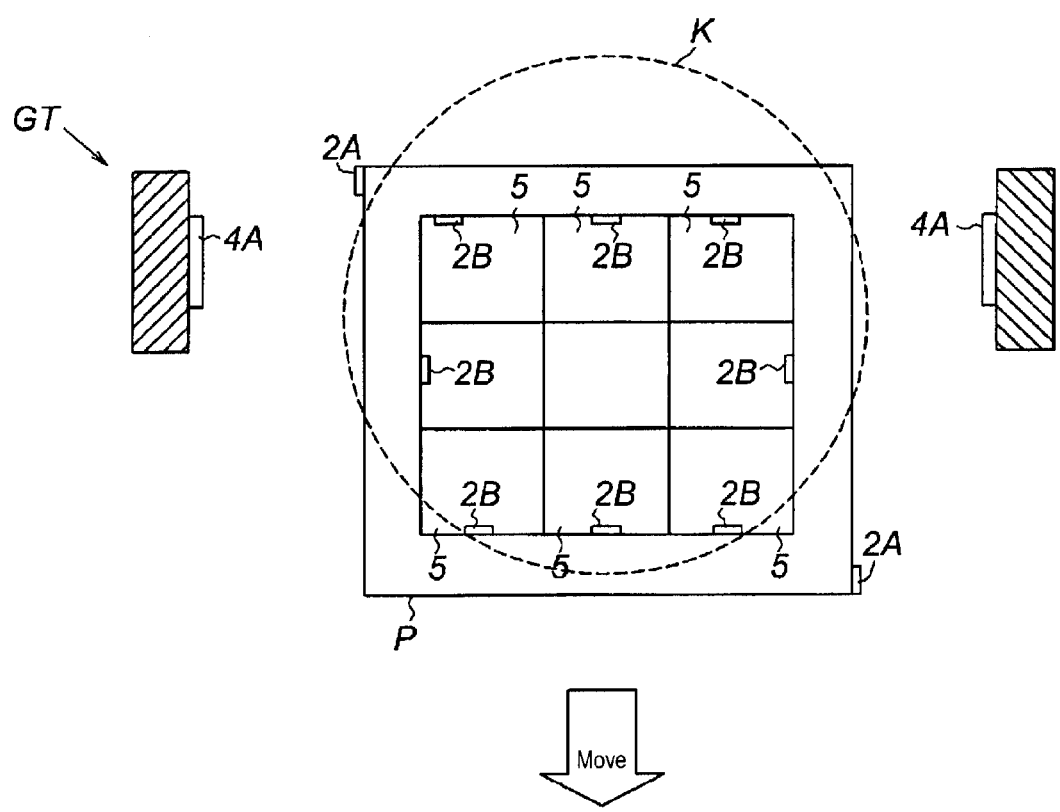
FIG. 6 is an explanatory view showing the directional direction and the communication area of the second antenna and the RFID tag belonging to the tag group when seen from the upper side of the gate of FIG. 3.

FIG. 4 is an explanatory view showing the directional direction and the communication area of each antenna, the representative RFID tag, and the RFID tag belonging to the tag group when seen from the front side of the gate of FIG. 3. FIG. 5 is an explanatory view showing the directional direction and the communication area of the first antenna and the representative RFID tag when seen from the upper side of the gate of FIG. 3. FIG. 6 is an explanatory view showing the directional direction and the communication area of the second antenna and the RFID tag belonging to the tag group when seen from the upper side of the gate of FIG. 3. In the figures, J is the communication area of the first antenna 4A, K is the communication area of the second antenna 4B, Q is the communication area of the representative RFID tag 2A, and R is the communication area of the RFID tag 2B belonging to the tag group 2.

<Requirements of Representative RFID Tag and RFID Tag Belonging to Tag Group>

The representative RFID tag 2A attached to the pallet P has the directional direction of NULL (site shown with an arrow Y2 in FIG. 4), and such directional direction of NULL is directed in the up and down direction of the gate GT as in FIG. 4. Each RFID tag 2B belonging to the tag group 2 also has the direction of NULL (site shown with an arrow Y1 in FIG. 4), but such directional direction of NULL is directed in the left and direction of the gate GT as in FIG. 4.

Here, the "directional direction of NULL" is the direction directed to the NULL point of the directional direction in the space at the periphery of the antenna. The NULL point is a point where the directivity pattern of the antenna drops (point where radiation electric field of the antenna is considered zero).

Figure 28:
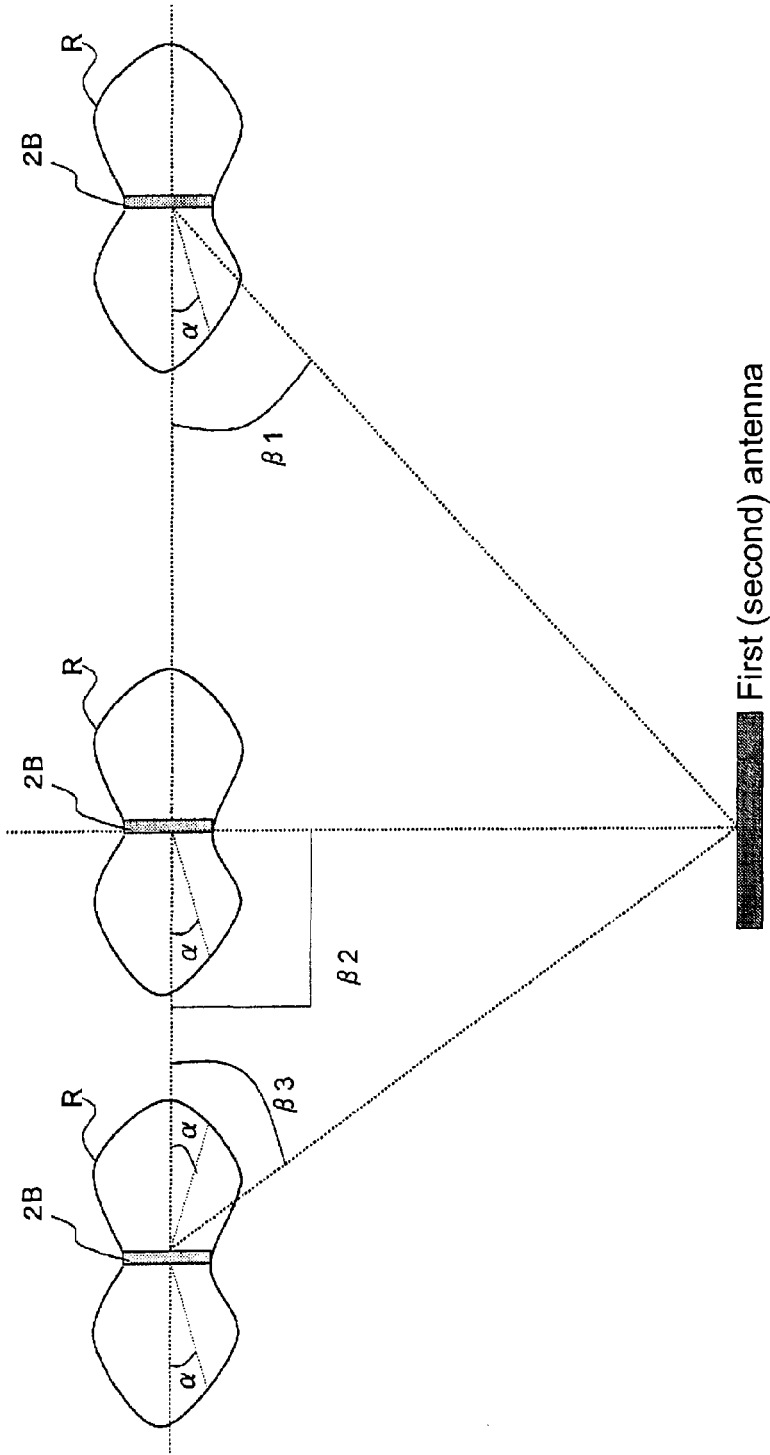
FIG. 28 is an explanatory view showing a relationship between an RFID tag and the directionality

The antenna having the directional direction of NULL is not a whip antenna that evenly radiates the radio waves in all directions, but is a directional antenna represented by a dipole antenna. "Direct the radio wave beam in the directional direction of NULL of the RFID tag" means "installing the RFID tag and the first (second) antenna so that the opposing angle of the first (second) antenna and the antenna of the RFID tag becomes greater than or equal to the angle of half the antenna gain of the RFID tag with the direction of the strongest gain of the RFID tag as a reference 0°, and dropping the communication success rate of the RFID tag and the reader" at the time of passing through the tag (see FIG. 28).

The representative tag 2A attached to the pallet P may be one, but a total of two representative tags 2A, one each on the diagonal line of the pallet P as shown in FIG. 5, is arranged in the present embodiment to lower the probability of disabling the communication with the representative tag 2A, so that the data can be read out from the representative RFID tag 2A by the first antenna 4A regardless of which direction the pallet P passes through the front of the first antenna 4A.

<Requirements of Radio Wave Beam Output from Antenna and Communication Area>

The RFID communication system can estimate the moving direction of the representative RFID tag 2A by creating an environment where the first antenna 4a does not read out or is hard to read out the data from the extra RFID tag (e.g., RFID tags 2B belonging to the tag group 2 etc.) other than the representative RFID tag 2A when estimating and detecting the moving direction of the representative RFID tag 2A. The constituent elements (directionality, output intensity, communication area of radio wave beam) of the first antenna 4A required therefor desirably satisfy all three requirements 1 to 3 below.

Requirement 1: The radio wave beam output from the first antenna 4A is directed in the directional direction of NULL of the RFID tag 2B belonging to the tag group 2 as shown with an arrow Y1 in FIG. 4.

Requirement 2: The output intensity of the radio wave beam output from the first antenna 4A is adjusted to a level communicable with only the representative RFID tag 2A attached to the pallet P.

Requirement 3: The communication area of the first antenna 4A is in a range indicated with the symbol J in FIG. 4 and FIG. 5, that is, the movement path of the representative RFID tag 2A that passes through the gate GT.

As shown with the arrow Y2 in FIG. 4, the radio wave beam output from the second antenna 4B is directed in the directional direction of NULL of the representative RFID tag 2A. The communication area of the second antenna 4B is a range indicated with the symbol K in FIG. 4 and FIG. 6, that is, a range that entirely covers the entire tag group 2 that passes through the gate GT.

<System Configuration for Associating Tag Group with Representative RFID Tag>

In the RFID communication system, the information on the estimated moving direction of the representative RFID tag 2A is added to the data read out from the RFID tag 2B of the tag group 2, as described above, but a system configuration for accurate association on whether or not the RFID tag 2B belonging to the tag group 2 and the representative RFID tag 2A are actually correctly associated with each other is necessary as a premise therefor. Each package 5 given the RFID tag 2B belonging to the tag group 2 and the pallet P given the representative RFID tag 2A are physically independent. Thus, the moving direction of the representative RFID tag given to a pallet different from the pallet P on which the package 5 is actually mounted may be estimated. In this case, the wrong moving direction of the representative RFID tag is added.

The system requirement necessary for preventing such drawbacks and accurately associating the RFID tag 2B belonging to the tag group 2 with the representative RFID tag 2A is to satisfy all of the following requirements 4 and 5.

Requirement 4: The communication area J of the first antenna 4A and the communication area K of the second antenna 4B are partially overlapped as shown in FIG. 4.

Requirement 5: In the RFID communication system, the first antenna 4A reads out the data from the representative RFID tag 2A a plurality of times, and the second antenna 4B collectively reads out the data from each RFID tag 2B of the tag group 2 during the readout of the first antenna 4A (e.g., at the time point tenth readout is completed if the number of readouts is set to 20 times). The data read out from the RFID tag 2B of the tag group 2 and the data read out from the representative RFID tag 2A are then made into a pair of associated data.

<Outline of First and Second Antennas>

Figure 11:
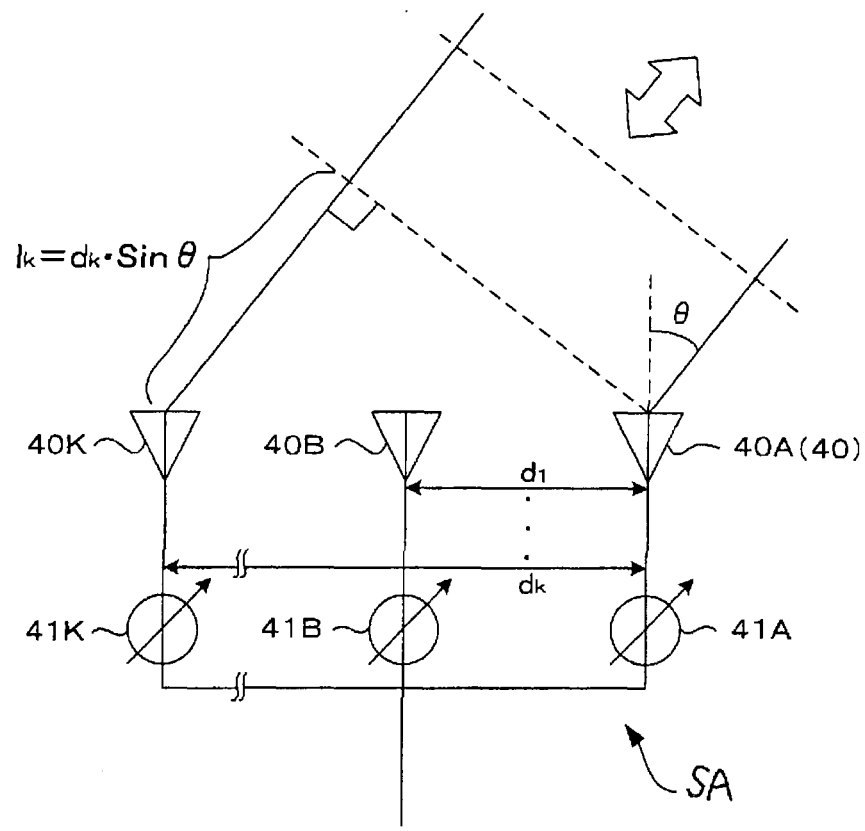
FIG. 11 is a schematic view showing the outline of the scan antenna (first antenna).
Figure 12:
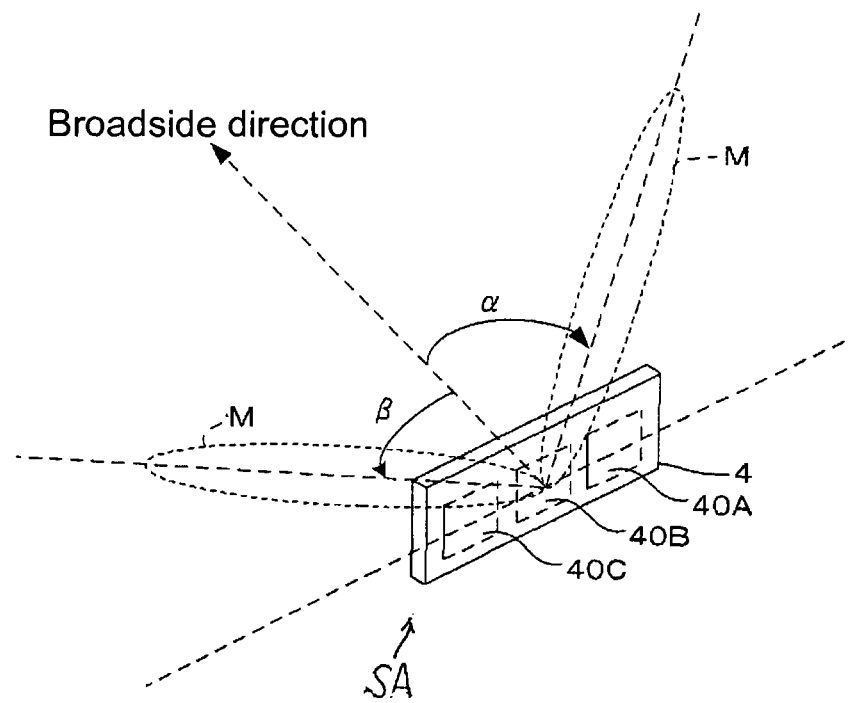
FIG. 12 is a schematic view showing a scanning state of the scan antenna (first antenna).

The first antenna 4A includes a scan antenna SA shown in FIGS. 11 and 12, and is connected to the first reader/writer 3A through an antenna cable CA1 and a control cable CA2 as shown in FIG. 2. The control cable CA2 is a cable for controlling the scan antenna SA, where a scan control signal is output from the first reader/writer 3A to the scan antenna SA through the control cable CA2. The scan antenna SA repeatedly scans the direction of the radio wave beam to be transmitted to the outside at a predetermined scan angle in response to the scan control signal. The details on the scan antenna SA will be described later.

The second antenna 4B is configured by a general known RFID antenna that does not have a scan function, and is connected to the second reader/writer 3B through the antenna cable CA1 as in FIG. 2.

<Details of Tag>

Figure 9:
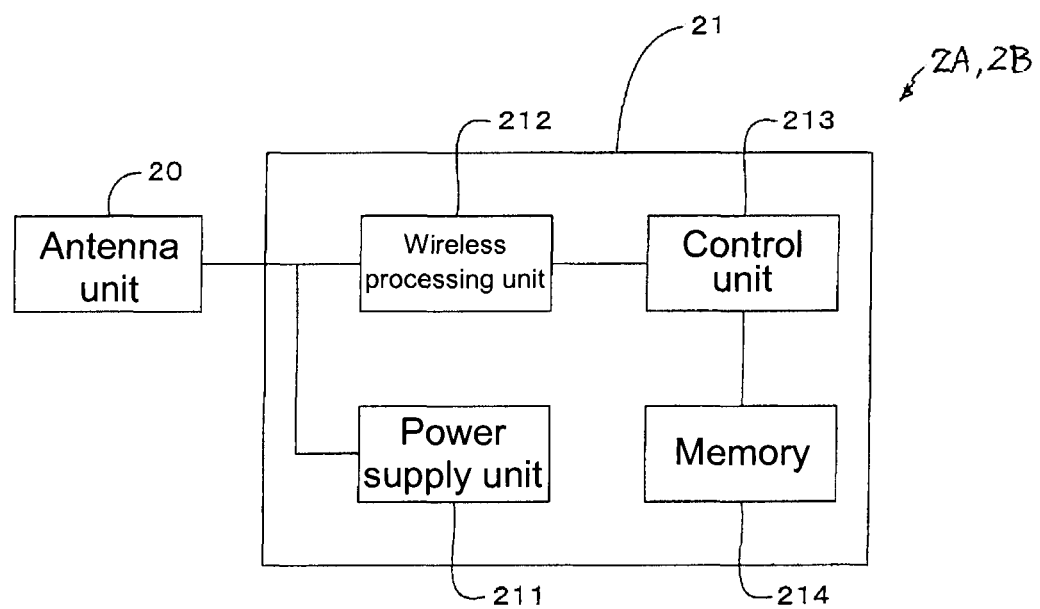
FIG. 9 is a block diagram showing a schematic configuration of the RFID tag.

The schematic configuration of the representative RFID tag 2A and the RFID tag 2B belonging to the tag group 2 is shown in FIG. 9. As shown in the figure, both of such tags have a configuration including a tag antenna unit 20 and a wireless communication IC 21. Such tags used may be a passive type or an active type.

The tag antenna unit 20 receives the radio waves from the reader/writer 3 as a power source for operating the wireless communication IC 21. The tag antenna unit 20 converts the radio waves received from the reader/writer 3A or 3B to the wireless signal and transmits the same to the wireless communication IC 21, and converts the wireless signal from the wireless communication IC 21 to the radio waves and transmits the same to the reader/writer 3. An antenna, a resonance circuit, and the like are used for the tag antenna unit 20.

The wireless communication IC 21 stores the data from the reader/writer 3A or 3B or transmits the stored data to the reader/writer 3A or 3B through the tag antenna unit 20 based on the signal received from the reader/writer 3A or 3B through the tag antenna unit 20. As shown in FIG. 2, the wireless communication IC 21 has a configuration including a power supply unit 211, a wireless processing unit 212, a control unit 213, and a memory 214.

The power supply unit 211 rectifies the induced voltage generated when the antenna unit 20 receives the radio waves with a rectifier circuit, adjusts the same to a predetermined voltage with a power supply circuit, and provides the same to each unit of the wireless communication IC 21. A bridge diode, a voltage adjustment capacitor, and the like are used for the power supply unit 211.

The wireless processing unit 212 performs a process of converting the wireless signal received through the tag antenna unit 20 to the original format and transmitting the converted data to the control unit 213, a process of converting the data received from the control unit 213 to a format suited for wireless transmission, and a process of transmitting the converted wireless signal to the outside through the tag antenna unit 20. An A/D (Analog to Digital) conversion circuit, a D/A (Digital to Analog) conversion circuit, a modulation/demodulation circuit, a RF circuit, and the like are used for the wireless processing unit 212.

The control unit 213 comprehensively controls the operation of various configurations described above in the wireless communication IC 21. The control unit 213 includes a logical operation circuit, a register, and the like, and functions as a computer. The operation control of various types of configurations is performed when the computer executes a control program. The program may be in a form of being installed to a ROM (Read Only Memory) and the like of the memory 214, and used by being read out. There may be adopted a form of downloading the program from the reader/writer 3A or 3B through the tag antenna unit 20 and the wireless processing unit 212 while installing the downloaded program in the memory 214, and executing the same.

In particular, the control unit 213 performs a process of storing the data from the reader/writer 3 to the memory 214, and a process of reading out the data stored in the memory 214 and transmitting the same to the reader/writer 3 through the wireless processing unit 212 and the tag antenna unit 20 based on the data received from the reader/writer 3A or 3B through the tag antenna unit 20 and the wireless processing unit 212.

The memory 214 is configured by the ROM, and a semiconductor memory such as a SRAM (Static RAM), an FeRAM (ferroelectric memory), and the like. The content stored in the memory 214 includes the control program and various other types of programs, as well as various types of data such as ID. The wireless communication IC 21 desirably uses a nonvolatile memory such as the ROM, and a memory with small power consumption such as the SRAM and the FeRAM since the radio waves transmitted from the reader/writer 3A or 3B are used as the power source.

<Outline of First and Second Reader/Writer, and First and Second Antenna>

The first and the second reader/writers 3A, 3B are both connected to a high-order computer 7 of the RFID tag communication system by way of the Internet with the Ethernet (registered trademark) cable CA3, as shown in FIG. 2.

The first reader/writer 3A is configured to have a control function of the scan antenna SA and an estimating function of the moving direction since the moving direction of the representative RFID tag 2A is estimated using the first antenna (scan antenna SA).

A general RFID reader/writer that does not have the control function of the scan antenna SA and the estimating function of the moving direction can be used for the second reader/writer 2B. The second antenna 4B connected to the second reader/writer 2B is a general RFID antenna without the scan function, and the second reader/writer 2B does not estimate the moving direction.

In the present embodiment, there may be adopted a configuration in which the reader/writers 3A, 3B are arranged in correspondence to the antennas 4A, 4B at one-to-one, but the reader/writers 3A, 3B may be integrated as one reader/writer.

<Details on First Reader/Writer and First Antenna (Scan Antenna)>

Figure 10:
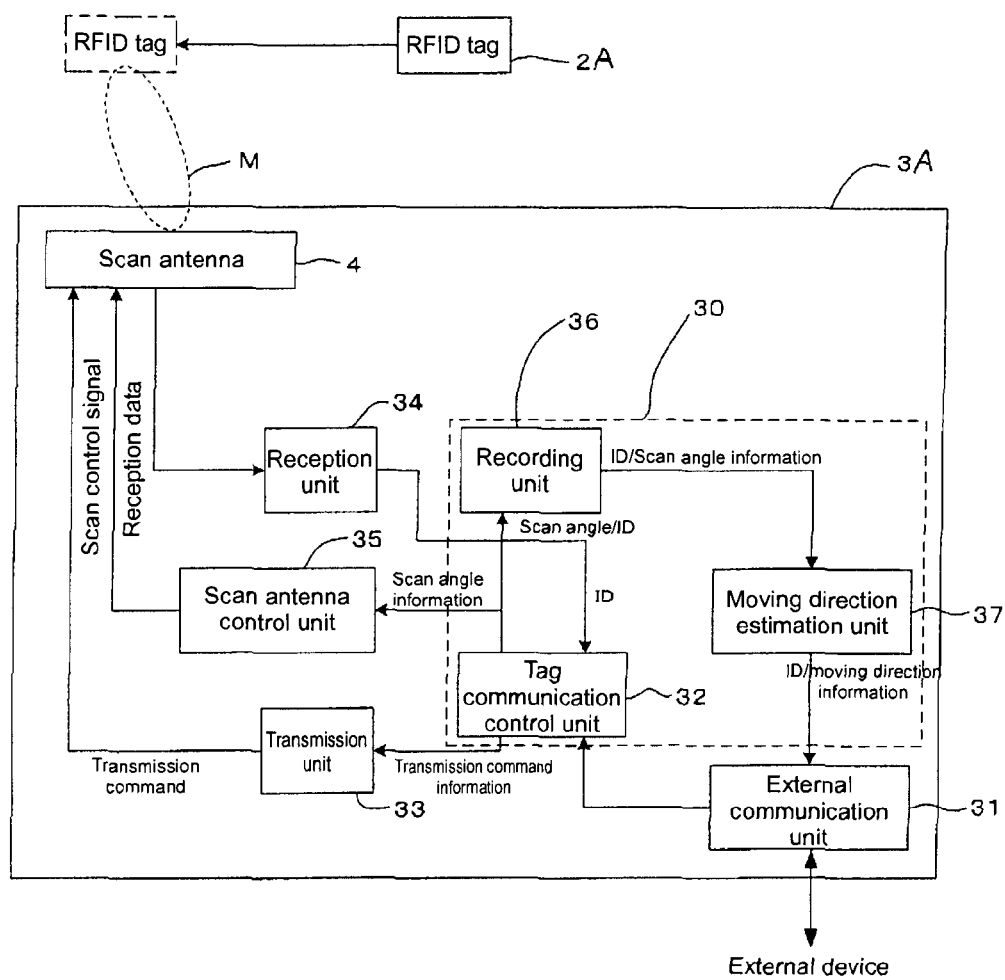
FIG. 10 is a block diagram showing a schematic configuration of the reader/writer.

FIG. 10 is a block diagram showing a schematic configuration of the first reader/writer, FIG. 11 is a schematic view showing the outline of the scan antenna used as the first antenna, FIG. 12 is a schematic view showing a scanning state of the scan antenna, FIG. 13 is a view showing a scan pattern table, and FIG. 14 is a view showing a measurement data table.

FIG. 10 also schematically shows a state in which the RFID tag 2A belonging to the tag group and the first reader/writer 3A wirelessly communicate through the scan antenna SA (first antenna 4A).

The first reader/writer 3A includes an external communication unit 31, a tag communication control unit 32, a transmission unit 33, a reception unit 34, a scan antenna control unit 35, a recording unit 36, and a moving direction estimation unit 37, and is configured to wirelessly communicate with the representative RFID tag 2A through the scan antenna SA (first antenna 4A). The first reader/writer 3A functions as estimation means 50 by including the moving direction estimation unit 37, so that the detection process of the moving direction of the representative RFID tag 2 can be performed.

The external communication unit 31 transmits the communication result with the representative RFID tag 2A such as the ID (Identification) of the representative RFID tag 2A read out by the reader/writer 3A, the moving direction information of the representative RFID tag 2A calculated by the moving direction estimation unit 37, the information indicating whether or not the write to the representative RFID tag 2A is successful, and the like to the high-order computer 7. The external communication unit 31 is configured to receive the write information (transmission command information) from the high-order computer 7 with respect to the representative RFID tag 2A and the command (instruction) from the high-order computer 7.

The tag communication control unit 32 receives the transmission command information transmitted from the high-order computer 7 through the external communication unit 31, and transmits the same to the transmission unit 33. The tag communication control unit 32 stores the scan pattern table T1 shown in FIG. 6.

The scan pattern table T1 includes data defining the power and the phase of each antenna element 40A, 40B, 40C of the scan antenna SA, where the scan pattern of the scan antenna SA is generated by electrically setting the power and the phase respectively defined for each antenna element 40A, 40B, 40C.

In other words, the scan angle of the scan antenna SA is set by the scan pattern table T1. As shown in FIG. 12, the scan angle is an inclination angle of the radio wave beam M measured with the broadside direction (direction perpendicular to the arraying direction of the antenna elements 40A, 40B, ..., 40K) as a reference. In the present embodiment, the clockwise direction ($\alpha$) in the figure is a + value, and the counterclockwise direction ($\beta$) is a − value. The scan table T1 associates the scan angles $\alpha$, $\beta$ with the table NO., where the table NO. (0, 1) is the vertical axis in the moving direction determination graph G (plot graph), to be described later.

The tag communication control unit 32 reads out the scan angle from the scan table T1, and transmits the read scan angle to the scan antenna control unit 35. The tag communication control unit 32 sequentially repeats the scan angles $\alpha$ and $\beta$ and transmits the same to the scan antenna control unit 35 since the scan angles $\alpha$, $\beta$ are set in the scan pattern table T1 as the scan angle. The tag communication control unit 32 receives the ID the scan antenna SA read out from the representative RFID tag 2A, associates the scan angle ($\alpha$ or $\beta$) of the scan antenna SA in a case of receiving the ID with the ID as the scan angle at the time of ID readout, and then transmits the same to the recording unit 36. The scan angles $\alpha$, $\beta$ are not limited to two, and may be arbitrarily set by the user.

The transmission unit 33 converts the transmission command information transmitted from the tag communication control unit 32 to a format suited for wireless communication and transmits the converted wireless signal (transmission command) to the outside through the scan antenna SA, and performs processes such as modulation and amplification of the transmission command information.

The reception unit 34 converts the wireless signal (reception data) received through the scan antenna SA to the original format and transmits the converted data to the tag communication control unit 32, and performs processes such as amplification and demodulation of the reception data.

The scan antenna control unit 35 receives the scan angle information from the tag communication control unit 32 and transmits the scan control signal to the scan antenna SA based on the received scan angle information, and controls the direction of the radio wave beam M radiated from the scan antenna SA. The scan angles α, β are set in the scan pattern table T1. Thus, the scan antenna control unit 35 performs the process of converting the scan angles α, β to a scan control signal for the radio wave beam M radiated from the scan antenna SA to be sequentially directed in the directions of the scan angle α and the scan angle β, and transmitting the converted signal to the scan antenna SA.

The recording unit 36 records the information transmitted from the tag communication control unit 32, that is, the ID of the representative RFID 2A and the scan angles (α, β) at the time of ID readout associated as above in the measurement data table T2 shown in FIG. 14. The process of transmitting the recorded ID of the representative RFID tag 2A and the scan angle information at the time of ID readout to the moving direction estimation unit 37 is then performed. The measurement data table T2 includes "readout NO.", "readout time", "RFID tag NO.", and "table NO.", where the data corresponding to such items are recorded in the order the ID of the representative RFID tag 2A is read out by the scan antenna SA.

The "readout NO." in the measurement data table T2 indicates the order the ID of the representative RFID tag 2A is read out, and the "readout time" is the readout time when the scan antenna SA read out the ID from the representative RFID tag 2A, where the readout time is recorded by a clock of the recording unit 36. The readout NO. is recorded in the measurement data table T2 herein, but an embodiment in which the readout NO. is not recorded in the measurement data table T2 may be applied since the readout order can be determined with only the readout time.

The "RFID NO." is the ID the scan antenna SA read out from the memory 214 of the representative RFID tag 2A. The "table NO. (scan angle)" is set in association with the scan angles α, β in the scan pattern table T1, and is the vertical axis in the moving direction determination graph G, to be described later. In the present embodiment, two representative RFID tags 2A are given to one pallet P, but a case of reading out the ID from one of the representative RFID tags 2A is shown in FIG. 14. For instance, the representative RFID tag 2A having the RFID tag NO. "100001" is read out when the direction of the radio wave beam M mainly radiated from the scan antenna SA is the scan angle α.

The moving direction estimation unit 37 is configured to receive information such as the "readout NO.", the "ID", the "table NO.", and the like recorded in the measurement data table T2, and performs the moving direction determination process, to be described later, from the received information, and transmits the moving direction information calculated as a result and the ID to the external communication unit 31.

The scan antenna SA has a configuration in which a plurality of antenna elements 40 is linearly arrayed and a variable phase shifter (phase shifter) 41 is connected to each antenna element 40 as in FIG. 11. The antenna elements 40 are not limited to being linearly arrayed and may be arranged to a two-dimensional array. The width of the output radio wave beam M becomes narrow if the number of antenna elements 40 is increased. In FIG. 11, the number of antenna elements 40 is an arbitrary number, and a method of scanning the beam direction by the scan antenna SA will be described below with reference to the figure.

If all of the antenna elements 40A, 40B, . . . , 40K transmit the radio waves at the same phase, the radio waves radiated from the scan antenna SA is propagated as a plane wave in the broadside direction (direction perpendicular to the arraying direction of the antenna elements 40A, 40B, . . . , 40K). The phase of the radio waves transmitted from each antenna element 40A, 40B, . . . , 40K is to be shifted to satisfy the following equation to incline the propagating direction of the radio waves by an angle θ (rad) measured from the broadside direction.

As shown in FIG. 11, assume that the wavelength of the radio waves to for transmission or reception is λ(m), and the distance between the antenna element 40A, which becomes a reference, and the $k^{th}$ antenna element 40K is $d_k$(m). The distance between the equal phase plane passing through the antenna element 40A, which becomes a reference, of the equal phase planes shown with broken lines in FIG. 4 and the $k^{th}$ antenna element 40K is $I_k$(m). The shift $\phi_k$ of the phase of the $k^{th}$ antenna element 40K with respect to the phase of the antenna element 40A, which becomes a reference, can be expressed with the following equation.

$$\phi_k = (I_k/\lambda) \times 2\pi = (d_k \times \sin\theta/\lambda) \times 2\pi$$

Therefore, the scan antenna SA can direct the radio wave beam M in the target direction by having each phase shifter 41A, 41B, . . . , 41K shift the phase of the signal so as to satisfy the above equation. When receiving the radio waves, on the other hand, the direction of the received radio waves can be determined by detecting the shift of the phase of each antenna element 40A, 40B, . . . , 40K.

<Details of Scan Process>

Figure 15:
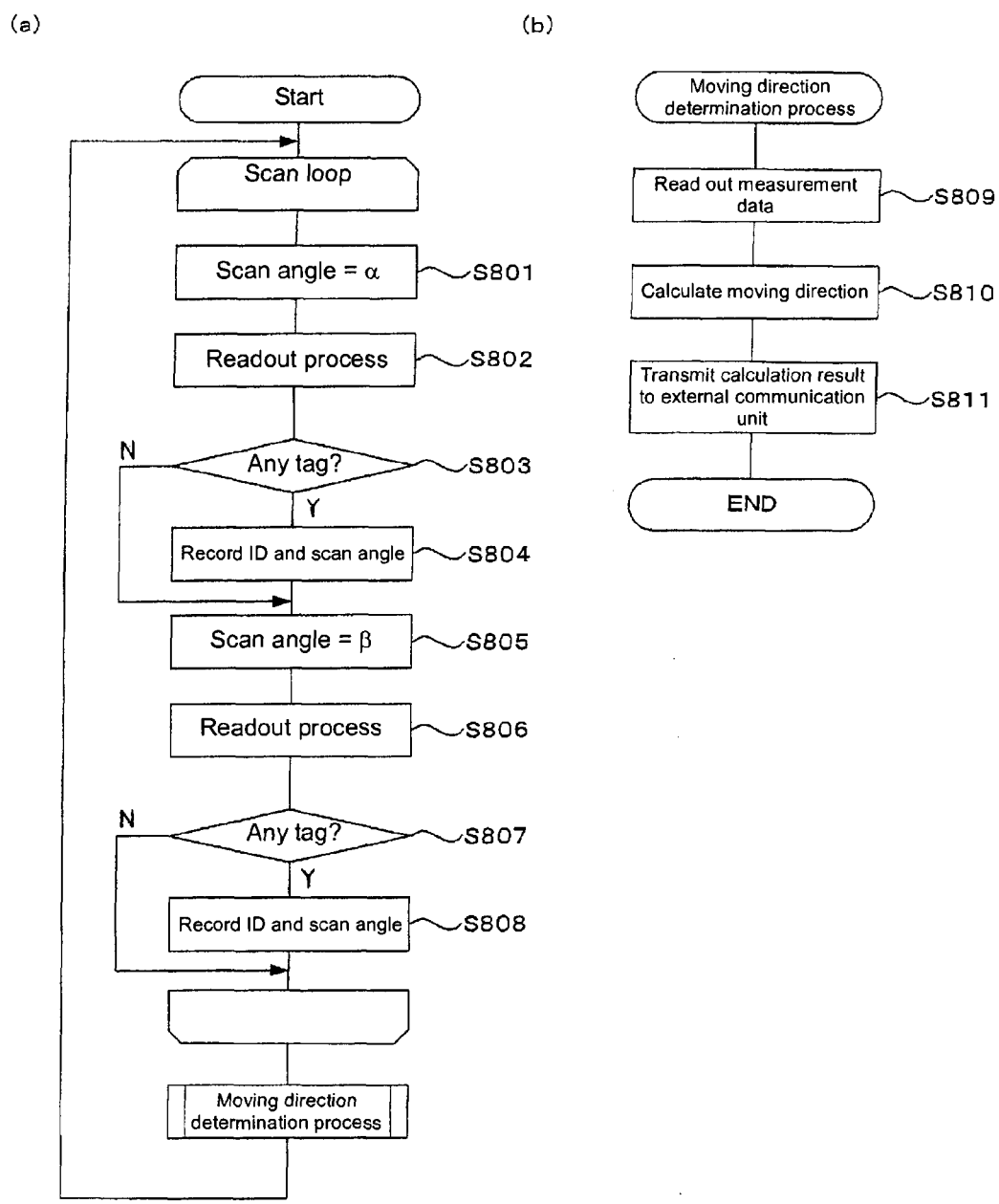
FIG. 15(a) is a flowchart showing a scan process in the scan antenna (first antenna), and (b) is a flowchart showing a moving direction determination process.

FIG. 15(a) is a flowchart showing the scan process and the moving direction determining process, and FIG. 15(b) is a flowchart showing the moving direction determination process.

The scan process starts when the tag communication control unit 32 receives the transmission command information transmitted from the high-order computer through the external communication unit 31. When the scan process starts, the tag communication control unit 32 transmits information on the scan angle with respect to the scan antenna SA (first antenna) based on the scan pattern table T1. In the present embodiment, two scan angles α and β are given.

Specifically, when the scan angle=α is transmitted from the tag communication control unit 32 to the scan antenna control unit 35 as the scan angle information (S801), the scan antenna control unit 35 transmits the scan control signal to the scan antenna SA so that the radio wave beam M transmitted from the scan antenna SA is directed in the direction of the scan angle=α. The scan antenna SA that received the scan control signal performs the readout process of radiating the radio wave beam M in the direction of the scan angle=α (S802). Whether or not the representative RFID tag 2A is present is examined from the result of the readout process. In other words, whether or not the ID is read out from the representative RFID tag 2A is examined (S803), where if the ID is read out (Y of S803), such ID and the scan angle information (scan angle α) are associated with each other and recorded in the measurement data table T2 with the readout NO. (S804). Similar processes are thereafter repeated for a predetermined time with the scan angle switched to β. The process then transitions to the moving direction determination process.

If the representative RFID tag 2A is not present, that is, if the reception information from the representative RFID tag 2A is not present as a result of performing the readout process, or if the signal from the representative RFID tag 2A is not normally received (N of S803), the processes similar to the above (S801 to S804) are performed with the scan angle switched to β (S805 to S808). After repeating such processes for a predetermined time, the process then transitions to the moving direction determination process to detect the moving direction of the package 5. The period of transition from the scan process to the moving direction determination process may be determined by the recorded number of IDs such as at the time point twenty IDs are recorded from when the ID of the representative RFID tag 2A is first stored in the measurement data table T2. The relevant period may also be determined by the elapsed time such as at the time point 150 ms has elapsed from the time point the first ID is recorded, or the time point of transition may be set in advance in the recording unit 36 or accepted as a command transmitted from the high-order computer 7.

The scan process and the moving direction determination process are parallel processes, and the scan process is repeatedly performed even while the moving direction determination process is being performed. In the present embodiment, the scan process and the moving direction determination process are parallel processes to enable high speed processing, but are not limited to parallel processes, and a configuration in which the scan process and the moving direction determination process are processed in series is also applicable.

<Details of Moving Direction Determination Process>

The moving direction determination process starts after a predetermined time has elapsed or the process is executed for a predetermined number of times after the first ID is recorded in the measurement data table T2 by the scan process. When the moving direction determination process starts, the measurement data table T2 recorded in the recording unit 36 is read out by the moving direction estimation unit 37 (S810). The read measurement data table T2 is temporarily stored in a buffer etc., and the moving direction calculation is performed based on the information of the stored measurement data table T2 (S811).

The moving direction calculation is performed in the following manner. First, a first moving direction calculation table T3 shown in FIG. 16(a) is generated from the "readout NO." and the "table NO." of the information read out from the measurement data table T2. The first moving direction calculation table T3 includes the "x (readout NO.)", the "y (table NO.)", the multiplication value of x, y "x*y", and the square value of x "x*x", as shown in FIG. 16(a).

A second moving direction calculation table T4 is generated using the first moving direction calculation table T3. The second moving direction calculation table T4 includes the sum of the numerical values from the first term (readout NO. 1) to the twentieth term (readout NO. 20) of x "Σx", the sum of the numerical values from the first row to the twentieth row of y "Σy", the sum of the numerical values from the first row to the twentieth row of x*y "Σx*y", the product of 20, which is the value of the readout NO. of the last row of x and the Σx*y "20*Σx*y", the sum of the numerical values from the first row to the twentieth row of x*x "Σx*x", and the product of 20, which is the value of the readout NO. of the last row of x and Σx*x "20*Σx*x".

Furthermore, calculating with each value of the second moving direction calculation table T4 substituted to the following moving direction calculation formula, a value of 0.0639 shown in FIG. 16(b) is calculated. A slope value S, which is the value calculated by the moving direction calculation formula, is the value in which the slope of a linear approximation line L, to be described later, is obtained.

$$\Sigma x \Sigma y - N \Sigma xy$$

$$\Sigma x \Sigma x - N \Sigma xx$$

A case of readout NO. 1 to 20, that is, a case in which the scan antenna SA reads out the ID twenty times from the representative RFID tag 2A has been described in the description of the moving direction calculation, but this is not the sole case, and the slope may be obtained according to the readout number of times with N of the moving direction calculation formula as the relevant number of times.

Figures 17, 18:
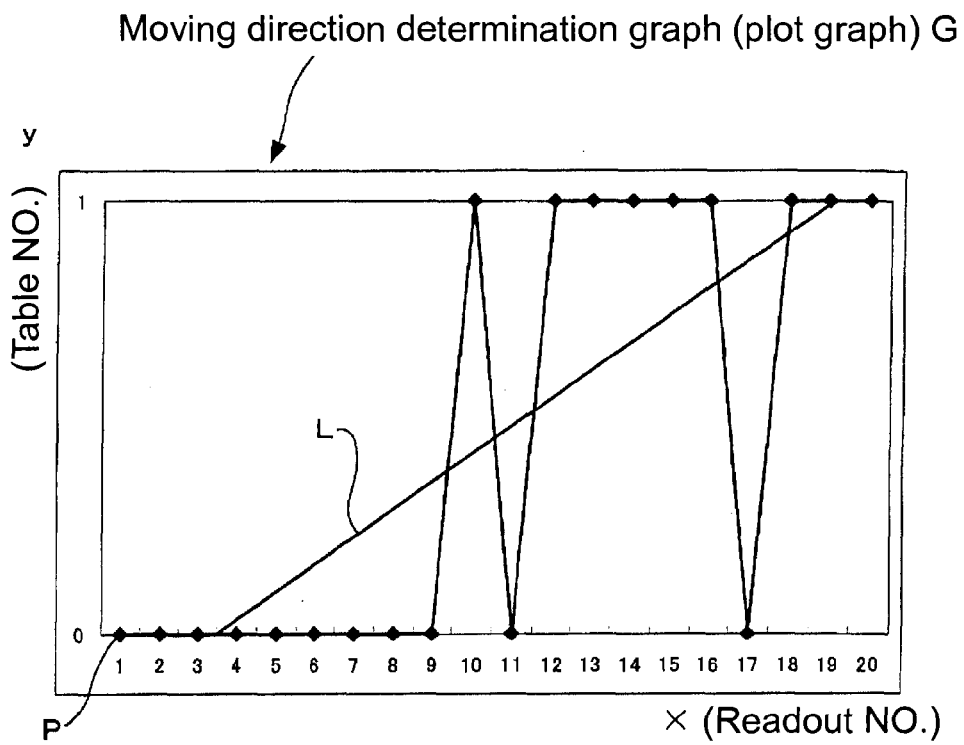
FIG. 17 is a view showing a moving direction determination graph.
FIG. 18 is an explanatory view of management tables arranged in the high-order computer 7.

Obtaining the slope value S means generating the moving direction determination graph G shown in FIG. 17 in terms of data, obtaining the linear approximation line L from such graph, and obtaining the slope of the obtained linear approximation line L. Specifically, the moving direction determination graph G is generated by plotting the value of x and the value of y of the moving direction calculation table T3 on the xy coordinate system with the y, i.e., the table NO. on the vertical axis and the x, i.e., the readout NO. on the horizontal axis. The linear approximation line L is then obtained from the moving direction determination graph G, and the slope of the linear approximation line L is calculated. The slope value S takes a positive value if the slope of the linear approximation line L shown in FIG. 17 slopes upward when going from left to right in FIG. 17. The slope value S takes a negative value if the slope slopes upward when going from right to left. The package 5 is defined in advance as moving in the direction of the arrow A in FIG. 3 if the value of the slope value S is a positive value, and in the direction of the arrow B in FIG. 3 if the value is a negative value. Thus, the moving direction of the representative RFID tag 2A can be detected by calculating the slope value S.

After the moving direction calculation is performed and the moving direction is estimated in the above manner, the moving direction estimated by such calculation is notified from the moving direction estimation unit 37 to the high-order computer 7 through the external communication unit 31 (S812), and the moving direction determination process is terminated.

The information of the moving direction calculated by the moving direction calculation, that is, the slope value S of negative value or positive value is converted such as 0 for the negative value and 1 for the positive value. The converted information of 1, 0 is associated with the ID of the representative RFID tag 2A of the measurement data table T2 temporarily stored in the moving direction estimation unit 37, and the associated ID is transmitted to the high-order computer 7 through the external communication unit 31.

Therefore, to which direction the representative RFID tag 2A is moving can be detected in the high-order computer 7.

<Details of High-Order Computer>

FIG. 18 is an explanatory view of management tables arranged in the high-order computer 7.

The high-order computer 7 performs a process of sending out various types of commands such as a command to start reading out data to the first and the second reader/writers 3A, 3B, and includes three management tables T4, T5, T6 shown in FIG. 18. The high-order computer 7 also performs a process of storing the data received from the first and the second reader/writers 3A, 3B to the corresponding management tables T4, T5, T6, and the like.

The first management table T4 includes "package ID", "pallet ID", and "moving direction". In the "package ID" field, data collectively read out by the second antenna 4B while the first antenna 4A reads out data from the representative RFID tag 2A a plurality of times, that is, the ID of each RFID tag 2B belonging to the tag group 2 is stored. The ID of the representative RFID tag 2A read out by the first antenna 4A is stored in the "pallet ID" field, and the moving direction of the representative RFID tag 2A estimated in the first reader/writer 3A is stored in the "moving direction" field.

The second management table T5 includes "pallet ID" and "moving direction", where the ID of the representative RFID tag 2A read out by the first antenna 4A is stored in the "pallet ID" field. The moving direction of the representative RFID tag 2A estimated in the first reader/writer 3A is stored in the "moving direction" field.

The third management table T6 includes "ID". In the RFID communication system, the second antenna 4B again performs collective readout after the representative RFID tag 2A moves out from the communication area J of the first antenna 4A, where the data read out at the time of such collective readout is stored in the "ID" field.

Figure 19:
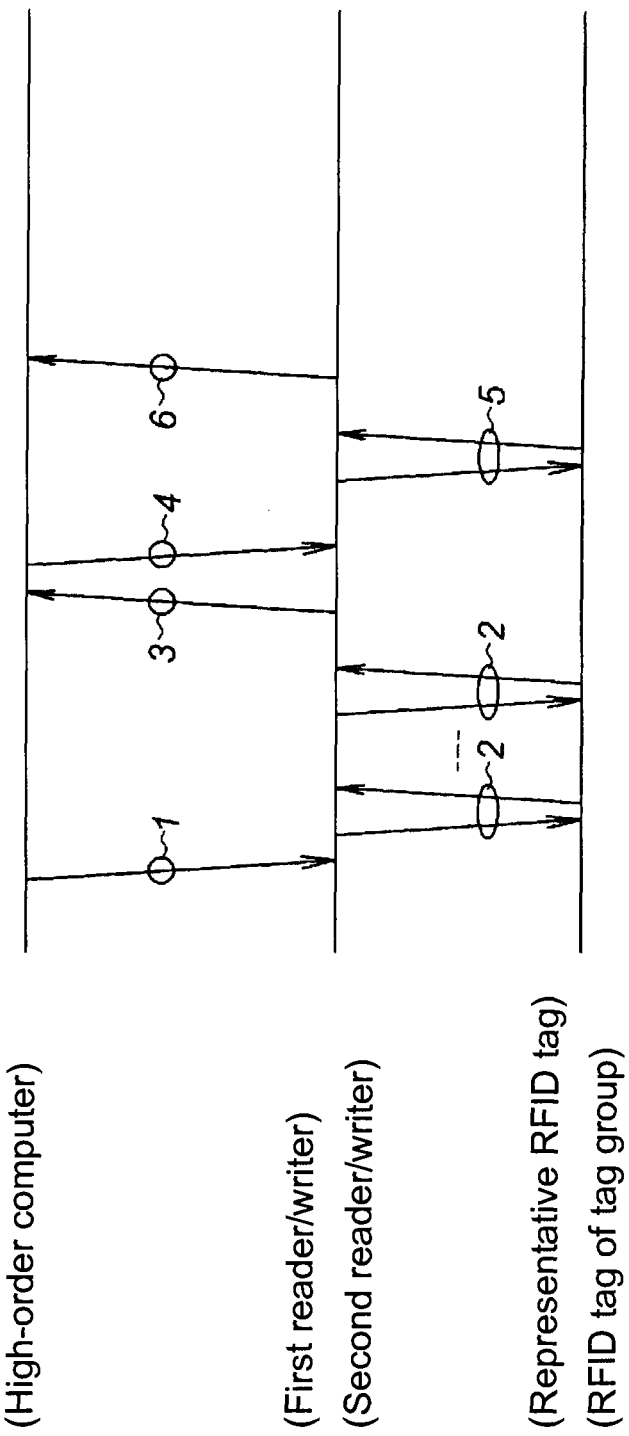
FIG. 19 is a data flowchart showing commands and data exchanged between the high-order computer, and the first and the second reader/writers.

FIG. 19 is a data flowchart showing commands and data exchanged between the high-order computer 7, and the first and the second reader/writers 3A, 3B.

In the RFID communication system, a command of readout instruction by scanning is transmitted from the high-order computer 7 to the first reader/writer 3A (arrow 1 in FIG. 19). The first reader/writer 3A that received the command reads out the ID from the representative RFID tag 2A through the first antenna 4A (scan antenna SA) for a defined number of times (arrow 2 in the figure). The read ID of the representative RFID tag 2A is transmitted from the first reader/writer 3A to the high-order computer 7 (arrow 3 in the figure), and stored in the "pallet ID" field of the second management table T5.

In the RFID communication system, a command C2 of collective readout instruction is transmitted from the high-order computer 7 to the second reader/writer 3B (arrow 4 in the figure). The second antenna 3B that received the command collectively reads out the ID from each RFID tag 2B of the tag group 2 through the second antenna 4B (arrow 5 in the figure). The read ID of each RFID tag 2B is transmitted from the second reader/writer 3B to the high-order computer 7 (arrow 6 in the figure), and stored in the "package ID" field of the first management table T4.

In the high-order computer 7, a matching process may be performed in advance before storing the ID of the representative RFID tag 2A in the "pallet ID" field of the second management table T5. In the matching process, the ID of the pallet P for use may be registered in the high-order computer 7 in advance, and the registered ID of the pallet P and the ID of the representative RFID tag 2A received from the first reader/writer 3A may be matched. If abnormality occurs such as no-match as a result of the matching, a warning may be output at the installed area of the first reader/writer 3A through the user interface.

<Description on Operation of Entire RFID Communication System>

Figure 20:
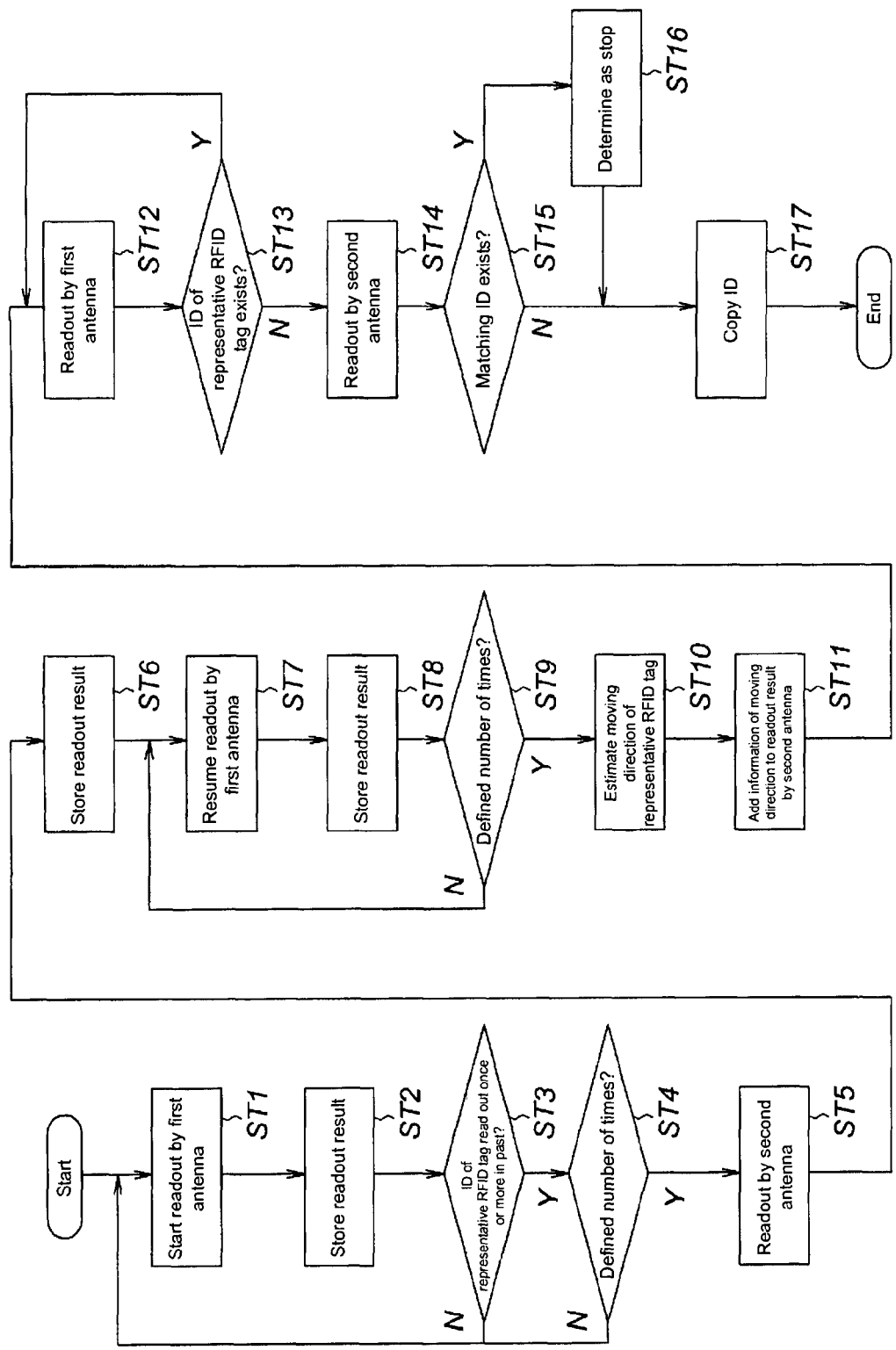
FIG. 20 is a flowchart showing the flow of processes of the entire RFID communication system.
Figure 21:
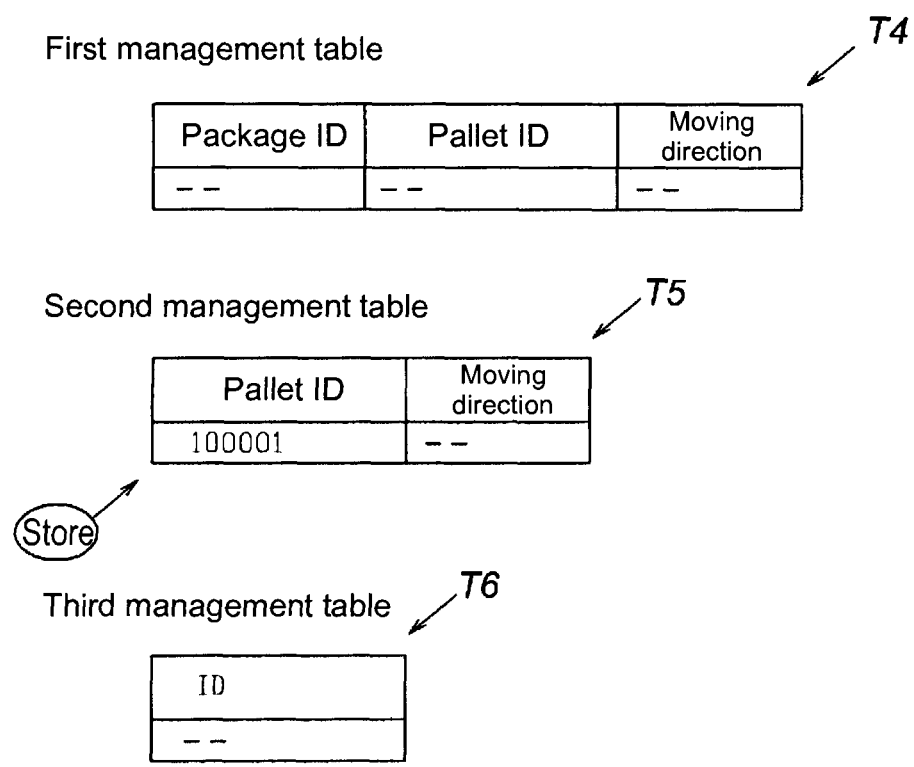
FIG. 21 is an explanatory view of the storage state of the data in the management tables of FIG. 18.
Figure 22:
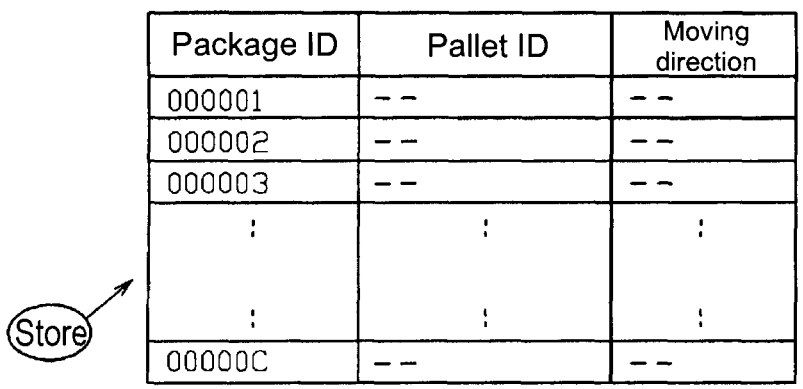
FIG. 22 is an explanatory view of the storage state of the data in the management tables of FIG. 18.
Figure 22:
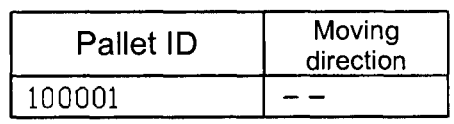
Figure 22:
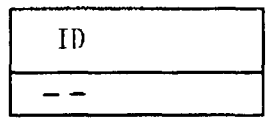
Figure 23:
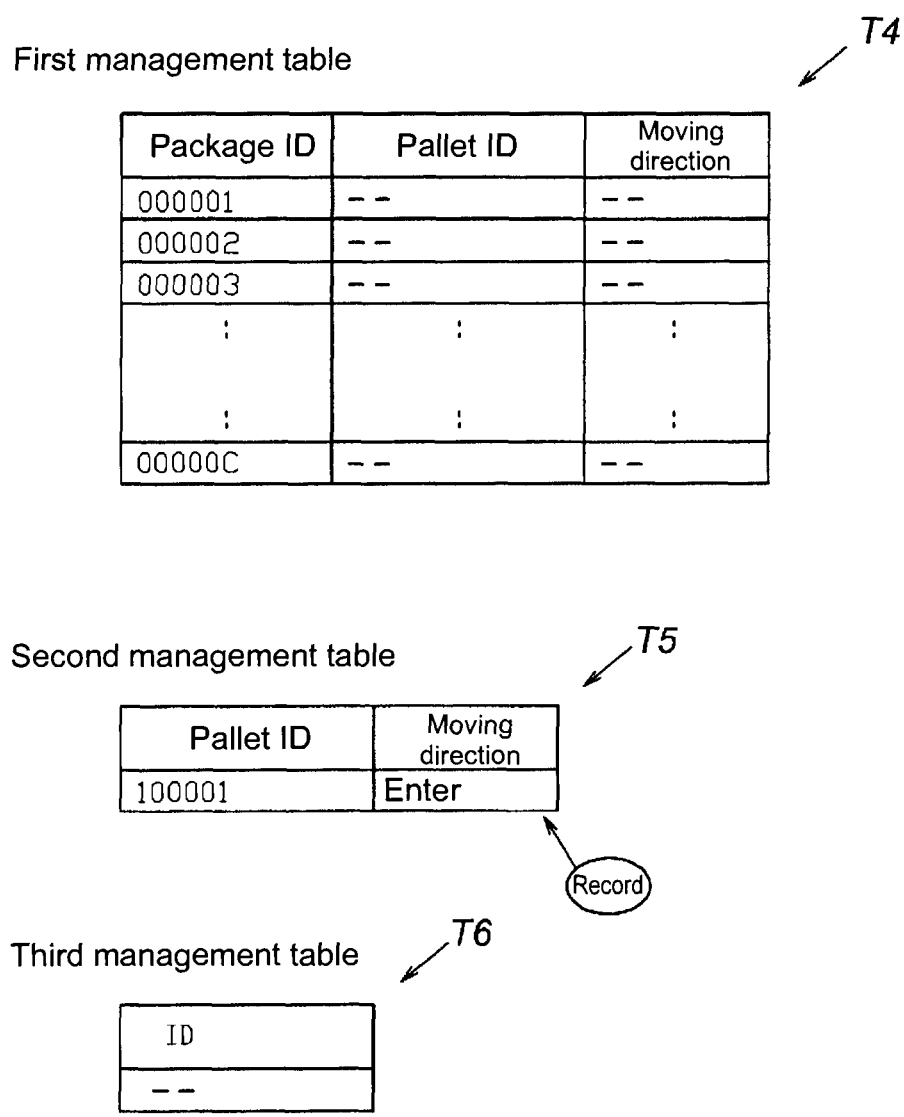
FIG. 23 is an explanatory view of the storage state of the data in the management tables of FIG. 18.

FIG. 20 is a flowchart showing the flow of processes of the entire RFID communication system and FIG. 21 to FIG. 27 are explanatory views of the storage state of the data in the management tables of FIG. 18, where the flow of processes of the entire RFID communication system will be described below based on the flowchart of FIG. 20.

As shown in FIG. 3, and FIG. 5 to FIG. 8, the following description relates to the flow of processes when a plurality of packages 5 with the RFID tag 2B is placed on one pallet P and passes through the gate GT, where such flow of processes is referred to as present process in the following description.

Furthermore, the readout number of times of the data by the first antenna 4A is assumed as 20 times in the following description, where the collective readout by the second antenna 4B is performed at the time point the tenth readout operation by the first antenna 4A is completed and thereafter the remaining ten readout operations are performed by the first antenna 4A.

The present process starts the readout by the first antenna 4A (scan antenna SA) in the first reader/writer 3A (see FIG. 5: ST1), and the readout result is stored in the "representative RFID tag NO." field of the measurement data table T1 shown in FIG. 14.

In ST1, nothing is stored in the measurement data table T1 if no ID is read out. When the pallet P passes through the gate GT as in FIG. 5 and the ID of the representative RFID tag 2A given to the pallet P is read out, such ID is stored. The read ID of the representative RFID tag 2A is transmitted from the first reader/writer 3A to the high-order computer 7, and stored in the "pallet ID" field of the second management table T5 shown in FIG. 18 (see FIG. 21: ST2).

In the first reader/writer 3A, whether or not the ID of the representative RFID tag 2A has been read out once or more in the past from the start of process of the RFID communication system is determined (ST3) with reference to the measurement data table T1.

If the ID of the representative RFID tag 2A has not been read out even once in the past in ST3, a series of processes of ST1 to 3 is repeated (N of ST3). In other words, the readout by the first antenna 4A is performed until the representative RFID tag 2A is found, that is, until the representative RFID tag 2A given to the moving pallet P enters the communication area J of the first antenna 4A as in FIG. 5 and the ID of such representative RFID tag 2A is read out by the first antenna 4A.

If the ID of the representative RFID tag 2A has been read out at least once in the past in ST3, whether or not the readout number of times reached a defined number of times (ten times) is determined (Y of ST3, ST4).

The series of processes of ST1 to 4 are repeated if the readout number of times of the ID has not reached the defined number of times (ten times) in ST4 (N of ST4), and the readout by the first antenna 4A is temporarily interrupted if the defined number of times (ten times) is reached (Y of ST4), and the collective readout by the second antenna 4B is performed in the second reader/writer 3B immediately thereafter (ST5: see FIG. 6). The ID is thereby read out from each RFID tag 2B of the tag group 2, and all read IDs are transmitted from the second reader/writer 3B to the high-order computer 7 and stored in the "package ID" field of the first management table T4 shown in FIG. 18 (see FIG. 22: ST6).

Figure 7:
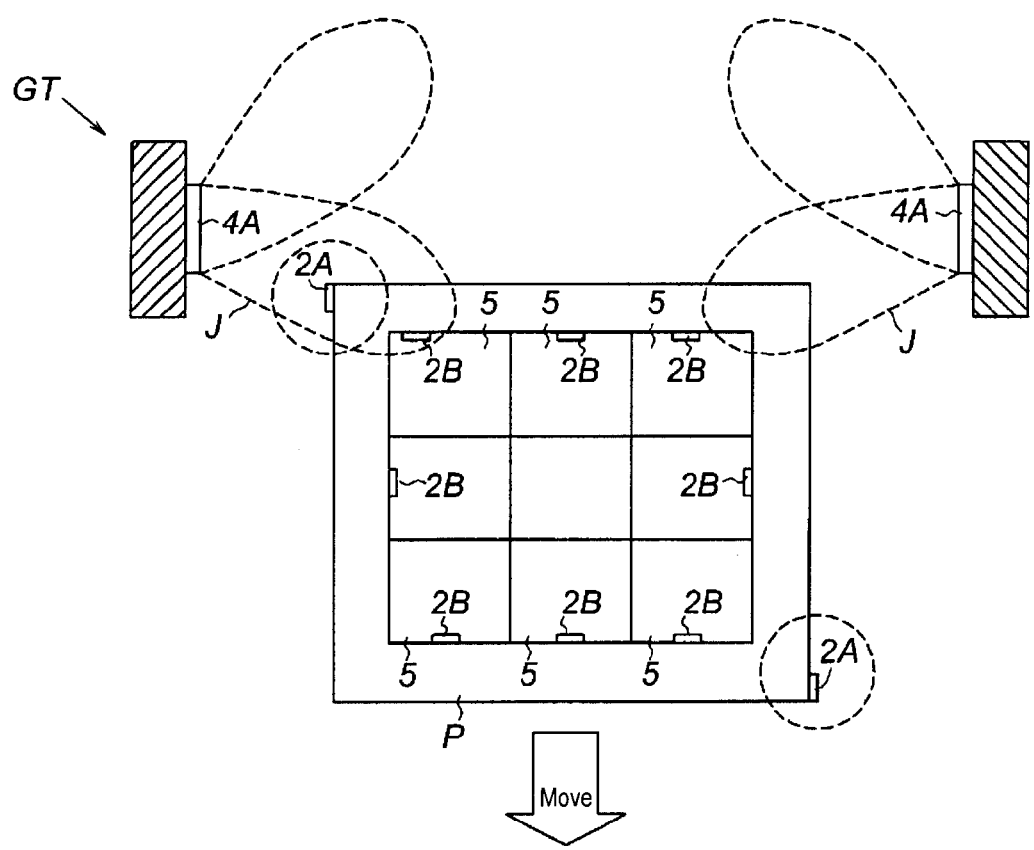
FIG. 7 is an explanatory view showing a state when the interrupted readout by the first antenna (scan antenna) is resumed.

Thereafter, the readout by the first antenna 4A interrupted in ST5 is resumed (see FIG. 7: ST7), and the readout result is stored in the "representative RFID tag NO." field of the measurement data table T1 (ST8).

In the first reader/writer 3A, whether or not the readout number of times of the ID of the representative RFID tag 2A reached the defined number of times (20 times) is determined (ST9) with reference to the measurement data table T1.

The processes of ST7 to 9 are repeated if the readout number of times of the ID has not reached the defined number of times in ST9, and the readout operation by the first antenna 4A is terminated and the moving direction estimating process is performed to estimate the moving direction of the representative RFID tag 2A if the defined number of times is reached. The estimated moving direction of the representative RFID tag 2A is transmitted from the first reader/writer 3A to the high-order computer 7 with the ID of the representative RFID tag 2A (ST10).

In summary, the processes from ST1 to ST10 described above are related to collectively reading out the ID as data from each RFID tag 2B of the tag group 2 by the second antenna 4B while the ID is being read out as data from the representative RFID tag 2A by the first antenna 4A for 20 times.

In the high-order computer 7, whether entering or exit is determined based on the moving direction of the representative RFID tag 2A received in ST10. If determined as entering, for example, "enter" is recorded in the "moving direction" field corresponding to the received ID of the representative RFID tag 2A in the second management table T5 (see FIG. 23).

Subsequently, in the high-order computer 7, the information of the moving direction of the representative RFID tag 2A is added to the ID stored in the "package ID" field of the first management table T4 in ST6, that is, the ID of each RFID tag 2B belonging to the tag group 2 (see FIG. 24). The information of the moving direction to add is "enter" (see FIG. 24) if the result of determining entering/exit based on the information of the moving direction is "enter", and the information of the moving direction to add is "exit" if the result is "exit" (ST11). The information "enter" or "exit" of the moving direction added at this time point is not yet set.

The readout by the first antenna 4A again starts in the first reader/writer 3A (see FIG. 7: ST12), and whether or not the pallet P exists near the gate GT is determined based on the readout result.

If the ID of the representative RFID tag 2A is read out by the first antenna 4A, the pallet P given the representative RFID tag 2A is determined to exist near the gate GT since the representative RFID tag 2A is within the communication area J of the first antenna 4A. If the representative RFID is not read out, the pallet P given the representative RFID tag 2A is determined to not to exist near the gate GT since the representative RFID tag 2A is outside the communication area J of the first antenna 4A (ST13).

If determined that the pallet P exists near the gate GT in ST13, the processes of ST12 and 13 are repeated until the ID of the representative RFID tag 2A given to the pallet P can no longer be read out (Y of ST13).

Figure 8:
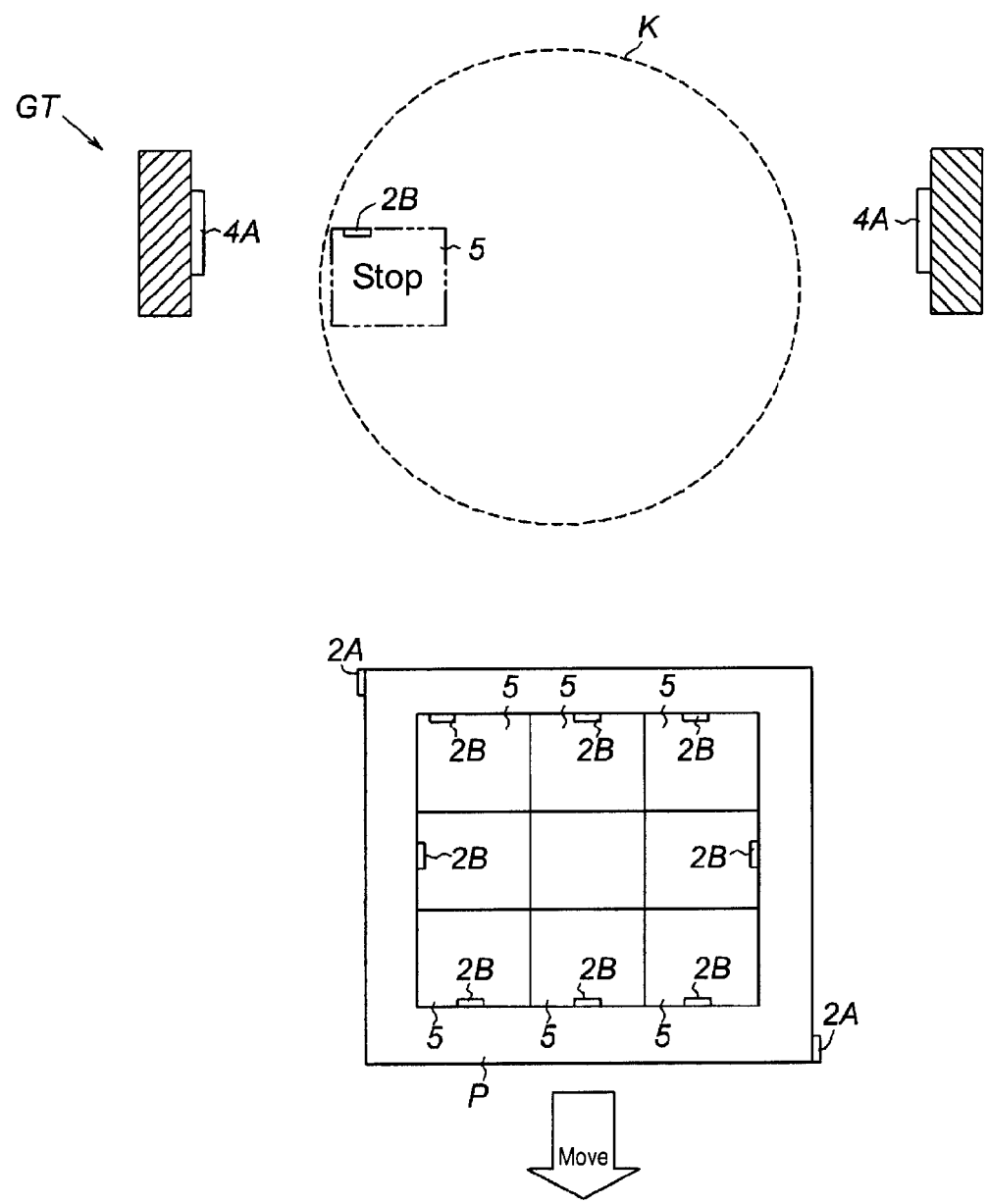
FIG. 8 is an explanatory view showing a state of collective readout by the second antenna performed after the representative tag exits from the communication area of the first antenna (scan antenna).

If determined that the pallet P does not exist near the gate GT in ST13, the readout operation by the first antenna 4A is canceled, and the collective readout by the second antenna 4B is performed immediately thereafter in the second reader/writer 3B (see FIG. 8: ST14).

The readout result of ST14 is transmitted from the second reader/writer 3B to the high-order computer 7. In the high-order computer 7, the received readout result of ST14 is stored in the third management table T6 shown in FIG. 21 (see FIG. 25). A case in which the RFID tag 2B of ID "000003" is read out is shown in FIG. 25. The third management table T6 and the first management table T4 are compared, and whether or not a matching ID exists in the tables T4, T6 is determined (ST15).

Figure 26:
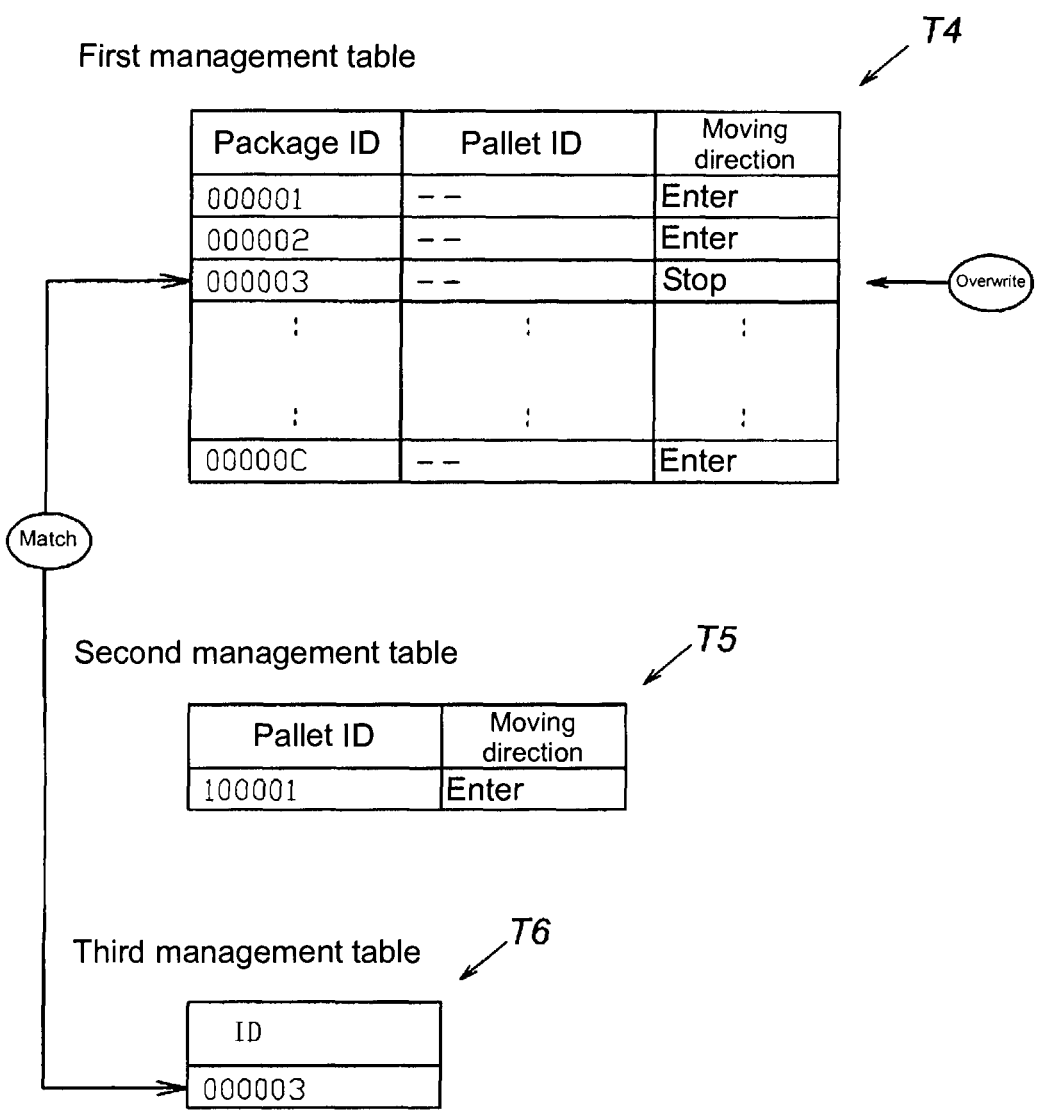
FIG. 26 is an explanatory view of the storage state of the data in the management tables of FIG. 18.

If a matching ID exists in ST15 (Y of ST15), the RFID tag 2B of the matching ID is determined as "stop", and a process of overwriting the content of the "moving direction" field corresponding to the matching ID to "stop" is performed in the first management table T4 (see FIG. 26: ST16).

In other words, the determination of stop in ST16 determines the RFID tag 2B specified by the ID as stopped when the ID of the RFID tag 2B belonging to the tag group 2 is read out in ST5 and such ID is also read out in ST14. Thus, the RFID tags 2B other than the RFID tag 2B determined as stop thus can be correctly associated ideally as integrally moving with the representative RFID tag 2A.

The RFID tag 2B determined as stop is given to the package 5 brought near the gate GT irrespective of the pallet P passing through the gate GT, the package 5 (see FIG. 8) dropped from the moving pallet P at near the gate GT, or the like, and is not associated with the representative RFID tag 2A given to the moving pallet P. In order to eliminate the non-associating RFID tag 2B, the "moving direction" field on the RFID tag 2B determined as stop is overwritten as "stop" in the first management table T4 in the RFID communication system. The information of the moving direction of the RFID tag 2B belonging to the tag group 2 is set at this time point.

Figure 27:
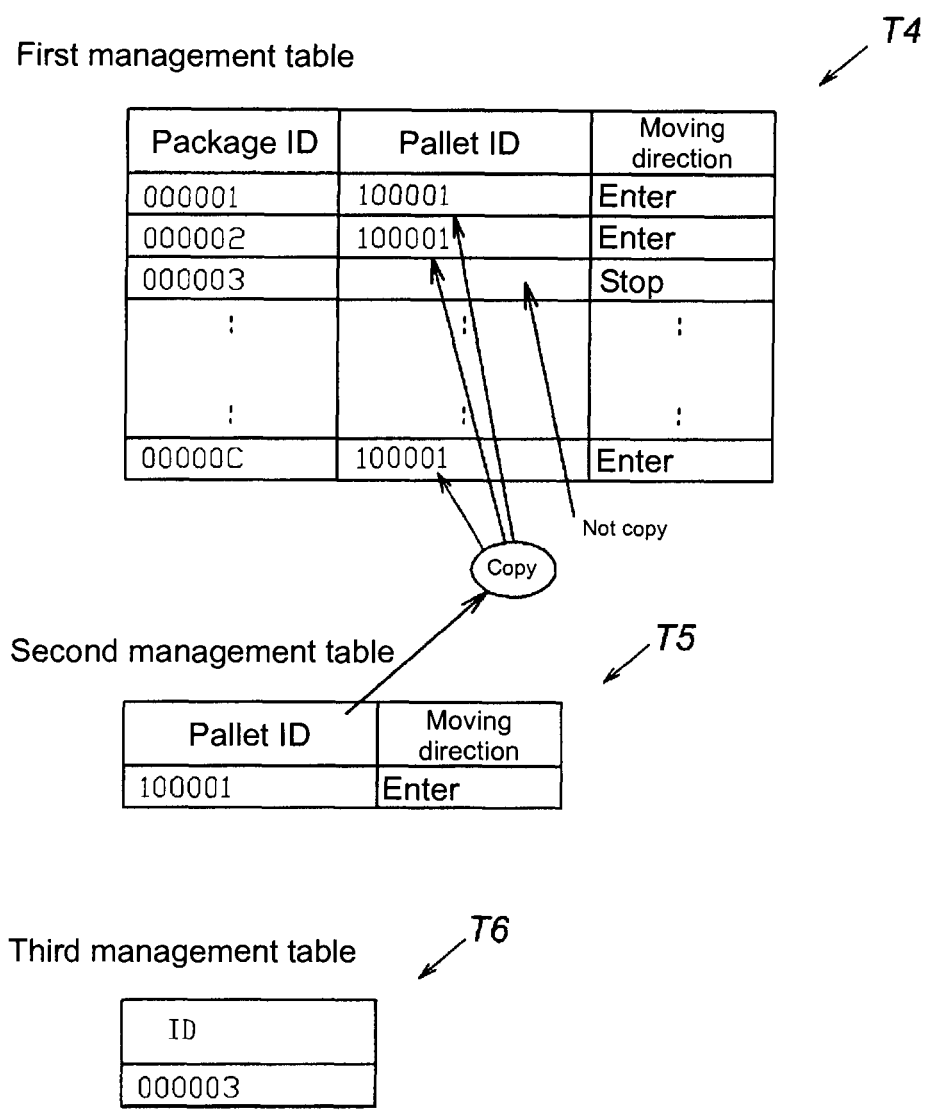
FIG. 27 is an explanatory view of the storage state of the data in the management tables of FIG. 18.

The ID stored in the "pallet ID" field of the second management table T5 is copied to the "pallet ID" field of the first management table T4 for those in which the RFID tag 2B belonging to the tag group 2 and the representative RFID tag 2A are associated with each other in ST16 (see FIG. 27: ST17), and then the present process is terminated. If a matching ID does not exist in ST15 (N of ST15), the present process is terminated after performing the copy process in ST17.

Through the copy process in ST17, the ID (data) read out from the representative RFID tag 2A and the ID (data) read out from each RFID tag 2B of the tag group 2 are correctly associated objectively and substantively with each other as a pair of associated data (see FIG. 27). The ID stored in the "pallet ID" field of the second management table T5, that is, the ID (data) read out from each RFID tag 2B of the tag group 2 is added with information of the moving direction, which is the attribute of the representative RFID 2A, as the information of the moving direction, which is the attribute of each RFID tag 2B (see FIG. 27).

The invention claimed is:

1. A tag associating method of associating RFID tags belonging to a tag group, and a representative RFID tag ranked as a representative of the tag group; the associating method comprising:

partially overlapping a communication area of a first antenna to read out data from the representative RFID tag and a communication area of a second antenna to read out data from said each RFID tag of the tag group;

reading out data from said each RFID tag of the tag group by the second antenna while the first antenna reads out data a plurality of times from the representative RFID tag;

making the data read out from the representative RFID tag and the data read out from said each RFID tag of the tag group into a pair of associated data;

wherein reading by the first antenna is temporarily interrupted if the readout number of times of said representative RFID tag has reached a first defined number, followed by collective read out by the second antenna;

resuming said read out by the first antenna, terminating said read out by the first antenna if the read out number of times of said representative RFID tag has reached a second defined number different from the first defined number, estimating a moving direction of the representative RFID tag;

wherein an attribute of said representative RFID tag is used as an attribute of said each RFID tag belonging to the tag group when said each RFID tag belonging to the tag group and the representative RFID tag are associated with each other;

and wherein information of the moving direction of the representative RFID tag, which is the attribute of the representative RFID tag, is used as information of a moving direction of said each RFID tag of the tag group, which is the attribute of said each RFID tag belonging to the tag group.

2. A tag moving direction detection system for detecting moving direction of RFID tags belonging to a tag group, the system comprising:
- a representative RFID tag ranked as a representative of the tag group;
- a first antenna configured to scan a radio wave beam toward a movement path of the representative RFID tag and reading out data from the representative RFID tag;
- a second antenna configured to collectively read out data from each RFID tag of the tag group;
- wherein said reading by the first antenna is temporarily interrupted if the readout number of times of said representative RFID tag has reached a first defined number;
- resuming said read out by the first antenna,
- terminating said read out by the first antenna if the read out number of times of said representative RFID tag has reached a second defined number different from the first defined number; and
- estimation means for estimating a moving direction of the representative RFID tag based on the data read out from the representative RFID tag by the first antenna, a readout time, and a scan angle at the time of readout of the representative RFID tag,
- wherein information of the moving direction of the representative RFID tag estimated by the estimation means is added as information of the moving direction or an attribute of said each RFID tag belonging to the tag group when said each RFID tag belonging to the tag group and the representative RFID tag are associated with each other;
- wherein the first antenna does not read out data from said each RFID tag of the tag group, other than the representative RFID tag, and
- wherein the scan angle is an angle indicating the radiation direction of beam when scan antenna scans the beam of transmitting radio wave.

3. The tag moving direction detection system according to claim 2, wherein a communication area of a first antenna and a communication area of a second antenna partially overlap;
- wherein the second antenna is configured to collectively read out data from said each RFID tag of the tag group while the first antenna reads out data a plurality of times from the representative RFID tag,
- wherein the data read out from the representative RFID tag and the data read out from said each RFID tag of the tag group are made into a pair of associated data.

4. The tag moving direction detection system according to claim 2,
- wherein said each RFID tag belonging to the tag group and the representative RFID tag have a directional direction of NULL,
- wherein a first radio wave beam output from the first antenna is directed in the directional direction of NULL of said each RFID tag belonging to the tag group,
- wherein a second radio wave beam output from the second antenna is directed in the directional direction of NULL of the representative RFID tag.

5. The tag moving direction detection system according to claim 2, wherein an output intensity of the first radio wave beam output from the first antenna is adjusted to a level communicable with only the representative RFID tag.

6. The tag moving direction detection system according to claim 4, wherein an output intensity of the first radio wave beam output from the first antenna is adjusted to a level communicable with only the representative RFID tag.

* * * * *